United States Patent [19]
Nakajima et al.

[11] Patent Number: 5,637,394
[45] Date of Patent: Jun. 10, 1997

[54] MAGNETO-OPTICAL RECORDING MEDIUM AND METHOD OF REPRODUCING MAGNETO-OPTICAL INFORMATION USING THEREOF

[75] Inventors: Junsaku Nakajima, Yamatotakada; Naoyasu Iketani, Tenri; Yoshiteru Murakami, Nishinomiya; Akira Takahashi, Nara; Hiroyuki Katayama, Sakura; Kenji Ohta, Kitakatsuragi-gun, all of Japan

[73] Assignee: Sharp Kabushiki Kaisha, Osaka, Japan

[21] Appl. No.: 356,857

[22] Filed: Dec. 15, 1994

[30] Foreign Application Priority Data

Dec. 17, 1993 [JP] Japan .................. 5-318734
Jul. 5, 1994 [JP] Japan .................. 6-153838

[51] Int. Cl.$^6$ ...................... G11B 5/66
[52] U.S. Cl. .............. 428/332; 428/336; 428/694 ML; 428/694 RE; 428/694 MM; 428/694 EC; 428/900; 427/127; 427/130; 427/131; 369/13; 369/283; 369/286
[58] Field of Search .................. 428/332, 336, 428/694 ML, 694 RE, 694 MM, 694 EC, 900; 365/13, 283, 286; 427/127, 130, 131

[56] References Cited

FOREIGN PATENT DOCUMENTS

| | | |
|---|---|---|
| 0415449A3 | 3/1991 | European Pat. Off. |
| 0509836 | 10/1992 | European Pat. Off. |
| 0509836A2 | 10/1992 | European Pat. Off. |
| 0536938A2 | 4/1993 | European Pat. Off. |
| 0608643 | 8/1994 | European Pat. Off. |
| 0608643A2 | 8/1994 | European Pat. Off. |
| 143041 | 6/1989 | Japan . |
| 143042 | 6/1989 | Japan . |
| 88156 | 4/1991 | Japan . |
| 93058 | 4/1991 | Japan . |
| 255941 | 9/1992 | Japan . |
| 258372 | 10/1993 | Japan . |

OTHER PUBLICATIONS

Murakami, "Super resolution Feedout of Magneto-optical Disk with an in-phase Magnetization Layer" J. Magn. Soc. Jpn., vol. 17, Supplement No. 51 (1993), pp. 201–204.

M. Kaneko, et al., "Multilayered Magneto-Optical Disks for Magnetically Induced Supperresolution," Jpn. J. Appl. Phys., vol. 31 (1992) pp. 568–575, Part 1, No. 2B, Feb. 1992.

(List continued on next page.)

*Primary Examiner*—Leszek Kiliman
*Attorney, Agent, or Firm*—David G. Conlin; Brian L. Michaelis

[57] ABSTRACT

A magneto-optical recording medium comprising a readout layer and a recording layer has a relationship that an external magnetic field H1 is smaller than an external magnetic field H4, where the H1 is a minimum external magnetic field necessary to make a magnetization direction of the readout layer direct to the direction reverse to a magnetization direction of the recording layer substantially at the room temperature, and the H4 is a maximum external magnetic field necessary to make the magnetization direction of the readout layer direct to the direction same as the magnetization direction of the recording layer at an high temperature not lower than a predetermined temperature. Moreover, the magneto-optical disk is provided, between the readout layer and the recording layer, with an intermediate layer which inhibits an effective bias magnetic field from the recording layer to the readout layer at the room temperature. Since it is possible to reproduce only the information in the high-temperature area close to the center of the laser beam irradiated during reproducing, recording density is improved. Furthermore, since an initializing magnetic field at reproducing is not necessary and the reproducing magnetic field can be made smaller, the apparatus can be made smaller and the electric power consumption can be decreased.

13 Claims, 24 Drawing Sheets

OTHER PUBLICATIONS

Y. Murakami, et al., "Super Resolution Readout of a Magneto–Optical Disk with an In–Plane Magnetization Layer," *J. Magn. Soc. Jpn., Proceeding of Magneto–Optical Recording International Symposium* '92, vol. 17, Supplement No. S1 (1993), pp. 201–204.

K. Aratani, et al., "Magnetically Induced Super Resolution in Novel Magneto–Optical Disk," *ODS* 1991, TuB3–1,3 pp. 112–115.

J. Nakajima et al, "Magneto–Optical Recording International Symposium," *Magneto–Optical Recording International Symposium Post Dead Line Papers Technical Digest,* Sep. 29, 1994.

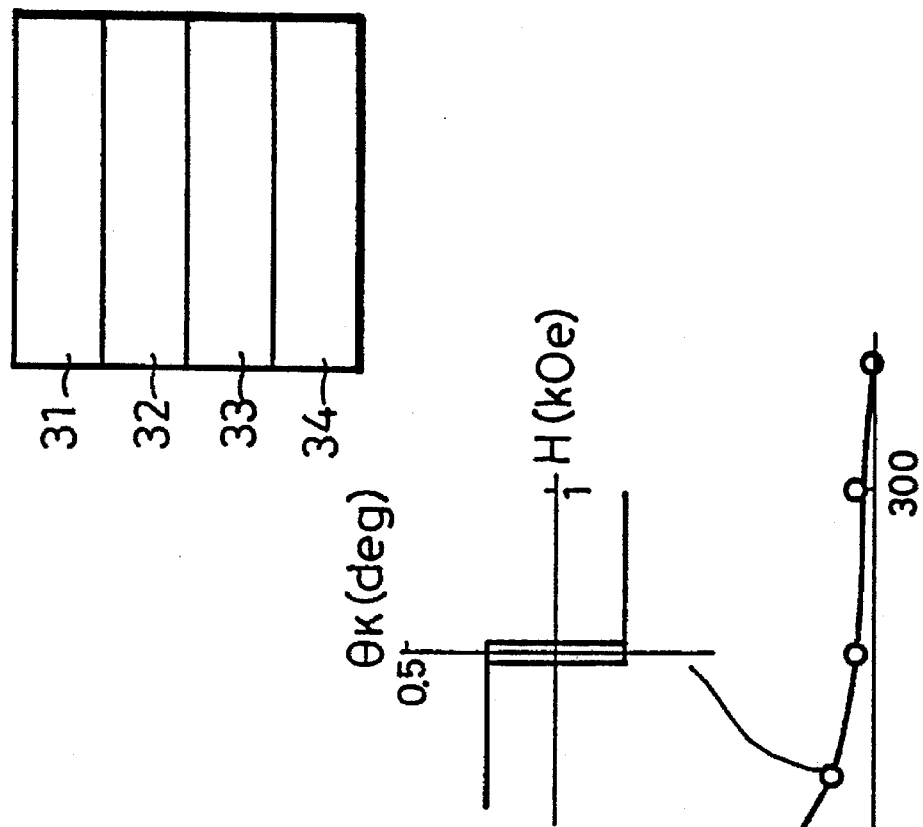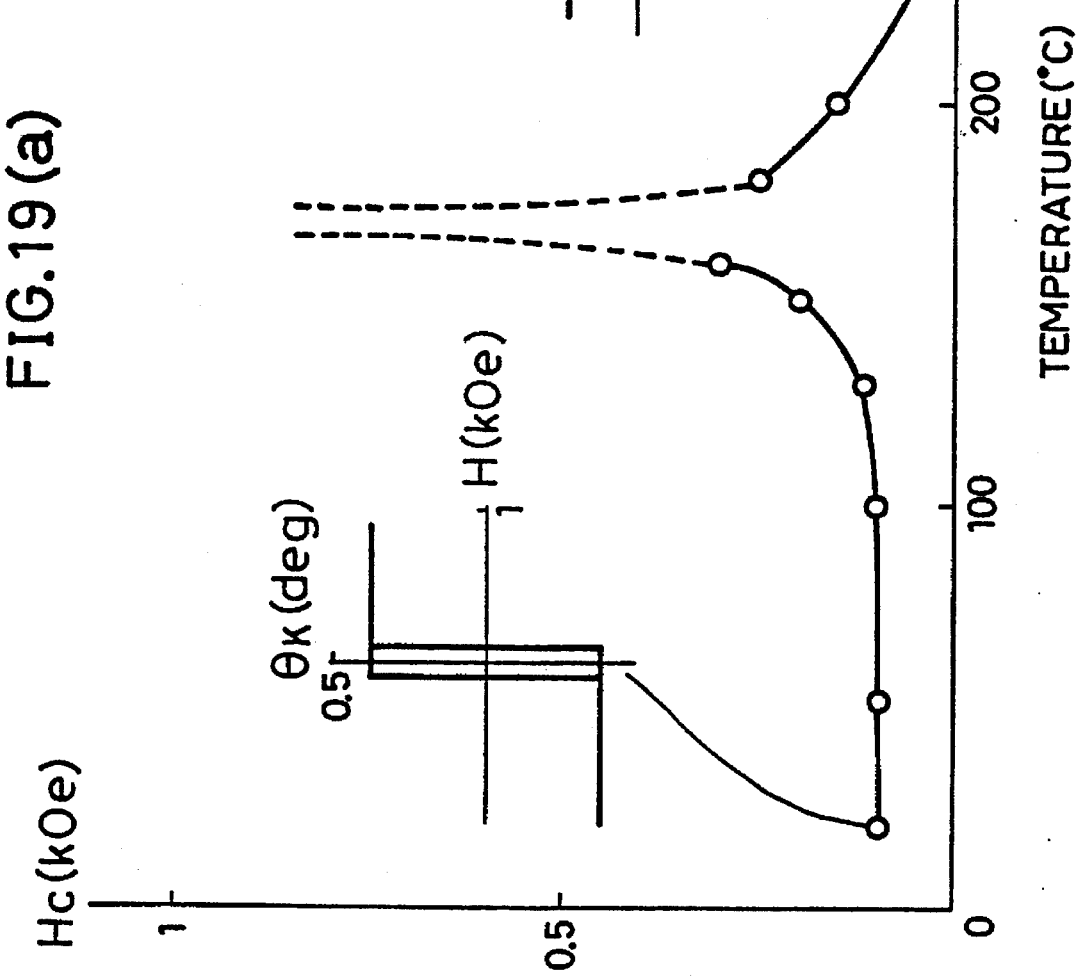

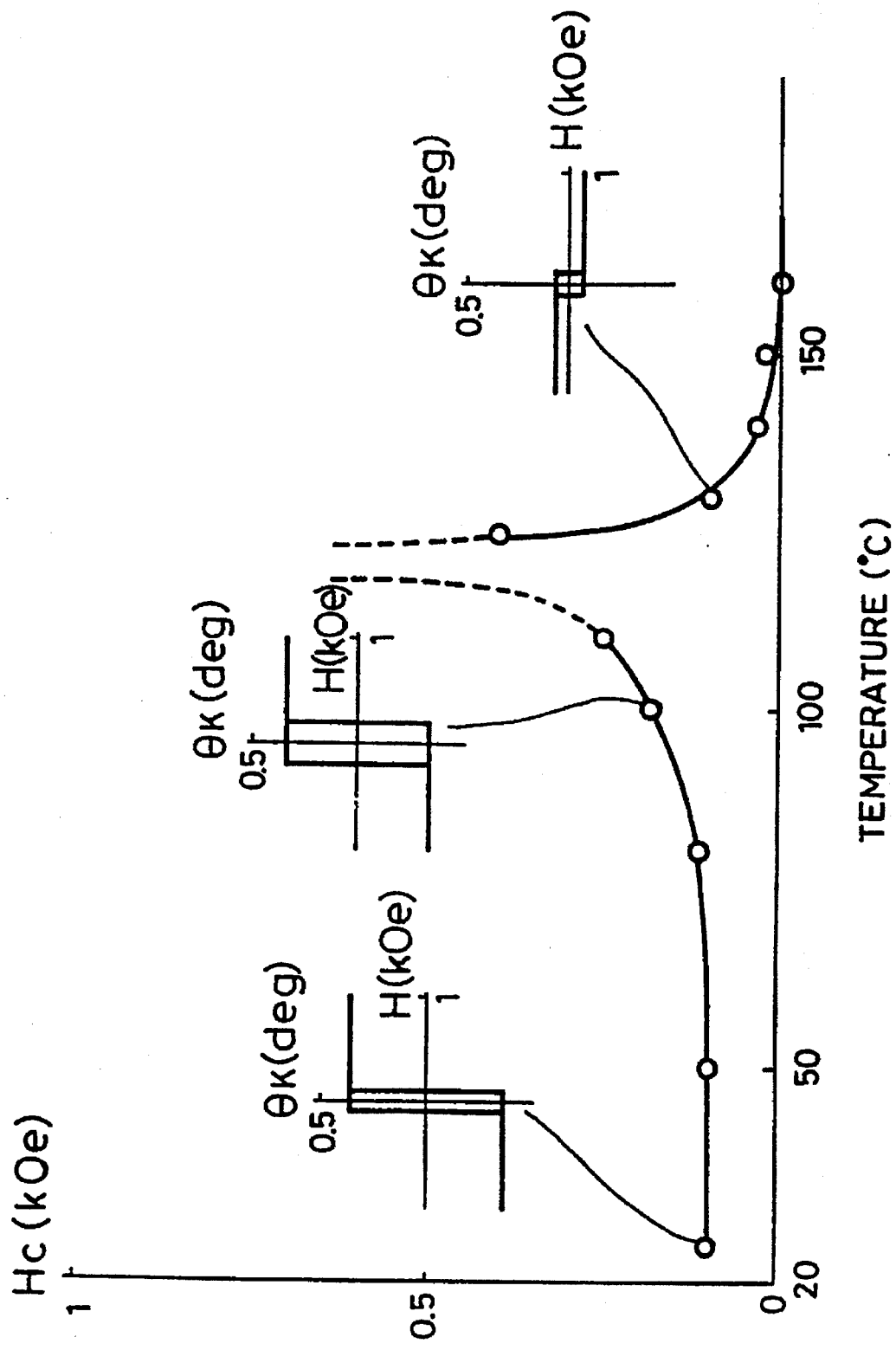

MAGNETO-OPTICAL RECORDING MEDIUM AND METHOD OF REPRODUCING MAGNETO-OPTICAL INFORMATION USING THEREOF

FIELD OF THE INVENTION

The present invention relates to a magneto-optical recording medium to be adopted in magneto-optical recording devices, such as a magneto-optical disk, a magneto-optical tape, a magneto-optical card, etc. and method of reproducing magneto-optical information using thereof.

BACKGROUND OF THE INVENTION

A magneto-optical disk is developed as a rewritable optical disk, and some kind of it is already in practice as an external memory for a computer.

In a magneto-optical disk using a perpendicular magnetization film as a recording medium, recording and reproducing is practiced using light, so recording capacity can be larger than a floppy disk and a hard disk which use an in-plane magnetization film.

A recording density of a magneto-optical disk is limited by the size of a light beam spot on the magneto-optical disk. In short, when a diameter of a recording bit and a distance of the recording bits are smaller than the diameter of the light beam spot, plural recording bits get into the light beam spot, so the recording bits cannot be reproduced separately.

Therefore, in order to improve the recording density, the diameter of the light beam spot needs to be small, and it is effective to make a wave length of a laser beam used as a reproducing light beam short for this purpose. However, the shortest wave length of a semiconducter laser beam in present market is 680 nm, and a semiconducter laser with shorter wave length is being developed and not served yet. Accordingly, it is difficult to improve a recording density with a conventional magneto-optical disk.

Compared with this, for example, Jap. Jour. Appl. Phys., Vol. 31(1992) pp. 568–575 discloses a magneto-optical disk which is arranged laminated with a readout layer and a recording layer which show perpendicular magnetic anisotropy respectively. In the journal, two methods(RAP and FAD) are proposed which reproduce a recording bit from an area smaller than a laser beam spot, using the above-described magneto-optical disk.

The methods use a phenomenon that laser beam irradiation raises a temperature of an irradiated area and causes a temperature distribution that the closer it is to a center of the laser spot, the higher the temperature is. The above-described readout layer and the recording layer are so set as to have different magnetic properties, respectively, between the condition where it is in a range of higher temperatures and the condition where it is in a range of lower temperatures than such a predetermined temperature to distinguish a high-temperature area close to the center and a low-temperature area surrounding thereof(an area of room temperature).

FIG. 31 shows a structure explaining a principle of the above-described RAD(Rear Aperture Detection) type. As shown in this figure, this magneto-optical disk has a laminated magnetic double layer of a readout layer 91 and a recording layer 92. During reproducing, first, an initializing magnetic field Hinit is applied at room temperature. The value of the initializing magnetic field Hinit is set between a coercive force of the readout layer 91 at room temperature and a coercive force of the recording layer 92 which is larger than that of the readout layer 91. Accordingly, only the magnetization direction of the readout layer 91 is set to the direction of the initializing magnetic field Hinit, that is, initialized.

Next, a laser beam 93 is irradiated, while a reproducing magnetic field Hr is applied which is an external magnetic field with a direction reverse to the magnetization direction of the initializing magnetic field Hinit. At this time, an area close to the center of the area irradiated with the laser beam 93 has a high temperature above the above-described predetermined temperature. The reproducing magnetic field Hr is so set as to accord to a coercive force of the readout layer 91 and an exchange-coupling force applied by the recording layer 92 at the high temperature. Namely, the reproducing magnetic field Hr is so set that the sum of both the exchange-coupling force applied to the readout layer 91 and the reproducing magnetic field Hr is larger than the coercive force of the readout layer 91 at the high temperature. Therefore, the magnetization direction of the readout layer 91, which directed to the recording layer 92 after the initialization, turns over so as to direct to the direction to which the exchange-coupling force from the recording layer 92 acts when it is the high temperature as above-described. Thus, an information of the recording layer 92 is transcribed.

As a result, the recording layer 92 is masked by the readout layer 92 at a surrounding area having a lower temperature than the predetermined temperature in the area irradiated with the laser beam 93. Therefore, a recording bit can be reproduced only from the high-temperature area close to the center smaller than the diameter of the laser spot.

On the other hand, as shown in the FIG. 32, the above-described FAD(Front Aperture Detection) type magneto-optical disk is so arranged as to have an intermediate layer which shows a perpendicular anisotropy and a Curie temperature lower than the predetermined temperature 103, between a readout layer 101 and a recording layer 102.

In the above-described arrangement, an exchange-coupling force between the readout layer 101 and the recording layer 102 acts through the intermediate layer 103 at a low temperature. Therefore, a magnetization direction of the readout layer 101 is the same as that of the recording layer 102. During reproducing, similarly to the above-described, a laser beam 104 is irradiated and a reproducing magnetic field Hr is applied. At this time, the temperature of the intermediate layer 103 is higher than the Curie temperature in a high-temperature area SH, which is hotter than the predetermined temperature, close to a center in a laser spot S. Accordingly, an exchange-coupling force gets not to act between the readout layer 101 and the recording layer 102. So, the magnetization direction of the readout layer 101 is arranged to the direction of the reproducing magnetic field Hr, unrelated to the magnetization direction of the recording layer 102. Thus, the high-temperature area SH is masked by the readout layer 101.

Therefore, a recording bit is reproduced which is lacated at a surrounding area SL outside the high-temperature area SH close to the center of the area irradiated with the laser beam.(Note that the area SH is, for example, an area having a crescent moon shape which is outside a high-temperature area, because a shape of the high-temperature area SH is an ellipse as shown in the figure when the disk lotates.) Accordingly, an recording bit Rb can be reproduced from the surrounding area SL which is smaller than the laser spot diameter S. Thus, recording density in the beam running direction can be improved. A Japanese unexamined application 143041/1989 (tokkaiheil-143041) and a Japanese unexamined application 143042/1989 (tokkaiheil-143042) disclose a method which improves reproducing resolution (linear recording density) in the light beam running direction, by reproducing a recording bit while expanding and erasing the recording bit during reproducing. Moreover, a Japanese unexamined application 93058/1991 (tokkaihei3-93058), a Japanese unexamined application 255941/1992 (tokkaihei4-255941), and a Japanese unexamined application 258372/1993 (tokkaihei5-258372) disclose a signal reproducing method which improves a track density as well as a density in the light beam running direction.

However, in the above-described RAD, two separately set external magnetic fields, that is, the initializing magnetic field and the reproducing magnetic field Hr are necessary according to each magnetic property of the readout layer 91 and the recording layer 92 both in the condition at room temperature and in the condition at a temperature higher than the predetermined temperature. So, the method has a problem that a recording-reproducing apparetus becomes large.

In the above-described FAD, the area SL having a crescent moon shapeoutside the area SH close to the center is concerned to reproducing in the laser spot. So, though recording density is improved in the disk running direction, crosstalk is easy to ocurr by invasion of a signal from a neighboring track when a track pitch is made narrow. Therefore, the method has a problem that it is difficult to improve a recording density in the direction along the disk diameter, that is, the direction perpendicular to the track.

On the other hand, in the methods disclosed in the Japanese unexamined application 143041/1989 (tokkaihei1-143041) and the Japanese unexamined application 143042/1989 (tokkaihei1-143042), linear recording density is improved, but, as crosstalk is the same as that in the conventional optical disk, it is difficult to improve a track density.

In the methods disclosed in the Japanese unexamined application 93058/1991 (tokkaihei3-93058) and the Japanese unexamined application 255941/1992 (tokkaihei4-255941). linear recording density and a track density are both improved, but a magnet to initialize the reproducing layer is necessary, so the apparatus grows large. In the method disclosed in the Japanese unexamined application 258372/1993 (tokkaihei5-258372), linear recording density and a track density are both improved, and a magnet to initialize the reproducing layer is not necessary. However, a large external magnetic field is necessary during reproducing, so the apparatus needs to be made large and more electric power is consumed.

SUMMARY OF THE INVENTION

An object of the present invention is to provide a magneto-optical recording medium which can improve recording density, make a recording-reproducing apparatus small and save electric power consumption and a method of reproducing a magneto-optical information using thereof.

In order to achieve the above-described object, a first magneto-optical recording medium in accordance with the present invention is characterized that the magneto-optical recording medium comprises a recording layer consisting of a magnetic layer having a perpendicular magnetic anisotropy, whereon an information is recorded, and a readout layer, which is provided on the readout layer, consisting of a magnetic layer having a perpendicular magnetic anisotropy, whereon the information recorded on the recording layer is reproduced by irradiation of light beam, and the readout layer and the recording layer have a relationship that an external magnetic field $H1$ is small than an external magnetic field $H4$, where the $H1$ is a minimum external magnetic field necessary to make a magnetization direction of the readout layer direct to the direction reverse to a magnetization direction of the recording layer substantially at room temperature, and the $H4$ is a maximum external magnetic field necessary to make the magnetization direction of the readout layer direct to the direction same as the magnetization direction of the recording layer at an established temperature (t) not lower than a predetermined temperature (tm).

A second magneto-optical recording medium in accordance with the present invention is as described in the above-described first magneto-optical recording medium and is characterized that the following condition is satisfied: $Hc1(ta)+Hw1(ta)<-Hc1(t)+Hw1(t)$ where $h1$ indicates a thickness of the readout layer, $Hc1(ta)$ a coercive force of the readout layer at a room temperature (ta), $Ms1(ta)$ a saturation magnetization of the readout layer at room temperature, $\sigma w(ta)$ a magnetic domain wall energy between the readout layer and the recording layer at the room temperature, $Hc1(t)$ a coercive force of the readout layer at the temperature (t), $Ms1(t)$ a saturation magnetization of the readout layer at the temperature (t), $\sigma w(t)$ a magnetic domain wall energy between the readout layer and the recording layer at the temperature (t), $Hw1(ta)$ an effective bias magnetic field applied to the readout layer from the recording layer at the room temperature, $Hw1(t)$ an effective bias magnetic field applied to the readout layer from the recording layer at the temperature (t), the effective bias magnetic fields $Hw1(ta)$ and $Hw1(t)$ satisfying $Hw1(ta)=\sigma w(ta)/2Ms1(ta)h1$ and $Hw1(t)=\sigma w(t)/2Ms1(t)h1$.

A third magneto-optical recording medium in accordance with the present invention is as described in the first magneto-optical recording medium and is characterized that the magneto-optical recording medium comprises an intermediate layer provided between the readout layer and the recording layer, which suppresses an effective bias magnetic field applied to the readout layer from the recording layer at room temperature.

A fourth magneto-optical recording medium in accordance with the present invention is as described in the third magneto-optical recording medium and is characterized that following condition is satisfied: $Hc1'(ta)+Hw1'(ta)<-Hc1'(t)+Hw1'(t)$, where $h1'$ indicates a thickness of a double-layer film consisting of the readout layer and the intermediate layer. $Hc1'(ta)$ a coercive force of the double-layer film at the room temperature (ta), $Ms'(ta)$ a saturation magnetization of the double-layer film at the room temperature, $\sigma w'(ta)$ a magnetic domain wall energy between the readout layer and the recording layer at the room temperature, $Hc1'(t)$ a coercive force of the double-layer film at the temperature (t), $Ms'(t)$ a saturation magnetization of double-layer film at the temperature (t), $\sigma w'(t)$ a magnetic domain wall energy between the readout layer and the recording layer at the temperature (t), $Hw1'(ta)$ an effective bias magnetic field applied to the readout layer from the recording layer at the room temperature, $Hw1'(t)$ an effective bias magnetic field applied to the readout layer from the recording layer at the temperature (t), the effective bias magnetic fields $Hw1'-(ta)$ and $Hw1'(t)$ satisfying $Hw1'(ta)=\sigma w'(ta)/2Ms1'(ta)h1'$ and $Hw1'(t)=\sigma w'(t)/2Ms1'(t)h1'$ A fifth magneto-optical recording medium in accordance with the present invention is as described in the third magneto-optical recording medium and is characterized that the intermediate layer consists of a single-layered magnetic layer where a magnetization direction changes from an in-plane magnetization to a perpendicular magnetization according to temperature rising from room temperature.

In order to achieve the above object, a first method of reproducing magneto-optical information in accordance with the present invention is characterized that the method comprises a step reading out an information by detecting a change of a light beam according to a magnetization direction of the readout layer with applying an external magnetic field Hr satisfying the following inequality:

$$H1<Hr<H4$$

substantially uniformly to a whole area irradiated with a light beam, using a magneto-optical recording medium as defined the first magneto-optical recording medium.

A second method of reproducing magneto-optical information in accordance with the present invention is the method as defined in the first method of reproducing magneto-optical information, characterized that in the step of reading out the information, an external magnetic field Hr which satisfies the following conditions is applied:

$$Hc1(ta)+Hw1(ta)<Hr<-Hc1(t)+Hw1(t),$$

$$Hr<Hc2(ta)-Hw2(ta),$$

and $$Hr<Hc2(t)-Hw2(t).$$

where h1 indicates a thickness of the readout layer, Hc1(ta) a coercive force of the readout layer at a room temperature (ta), Ms1(ta) a saturation magnetization of the readout layer at room temperature, σw(ta) a magnetic domain wall energy between the readout layer and the recording layer at the room temperature, Hc1(t) a coercive force of the readout layer at the temperature (t), Ms1(t) a saturation magnetization of the readout layer at the temperature (t), σw(t) a magnetic domain wall energy between the readout layer and the recording layer at the temperature (t), Hw1(ta) an effective bias magnetic field applied to the readout layer from the recording layer at the room temperature, Hw1(t) an effective bias magnetic field applied to the readout layer from the recording layer at the temperature (t), the effective bias magnetic fields Hw1(ta) and Hw1(t) satisfying Hw1(ta)=σw(ta)/2s1(ta)h1 and Hw1(t)=σw(t)/2s1(t)h1, and where h2 indicates a thickness of the recording layer, Hc2(ta) a coercive force of the recording layer at the room temperature (ta), Ms2(ta) a saturation magnetization of the recording layer at the room temperature, Hc2(t) a coercive force of the recording layer at the temperature (t), Ms2(t) a saturation magnetization of the recording layer at the temperature (t), Hw2(ta) an effective bias magnetic field applied to the recording layer from the readout layer at the room temperature, Hw2(t) an effective bias magnetic field applied to the recording layer from the readout layer at the temperature (t), the effective bias magnetic fields Hw2(ta) and Hw2(t) satisfying Hw2(ta)=σw(ta)/2Ms2(ta)h2 and Hw2(t)=σw(t)/2s2(t)h2.

A third method of reproducing magneto-optical information in accordance with the present invention is the method as defined in the first method of reproducing magneto-optical information, characterized that in the step of reading out the information the magneto-optical recording medium as defined claim 6 is prepared and an external magnetic field Hr which satisfies the following conditions is applied:

$$Hc1'(ta)+Hw1'(ta)<Hr<-Hc1'(t)+Hw1'(t),$$

$$Hr<Hc2(ta)-Hw2(ta),$$

and $$Hr<Hc2(t)-Hw2(t).$$

where h1' indicates a thickness of a double-layer film consisting of the readout layer and the intermediate layer, Hc1'(ta) a coercive force of the double-layer film at the room temperature (ta), Ms'(ta) a saturation magnetization of the double-layer film at the room temperature, σw'(ta) a magnetic domain wall energy between the readout layer and the recording layer at the room temperature, Hc1'(t) a coercive force of the double-layer film at the temperature (t), Ms'(t) a saturation magnetization of double-layer film at the temperature (t), σw'(t) a magnetic domain wall energy between the readout layer and the recording layer at the temperature (t), Hw1'(ta) an effective bias magnetic field applied to the readout layer from the recording layer at the room temperature, Hw1'(t) an effective bias magnetic field applied to the readout layer from the recording layer at the temperature (t), the effective bias magnetic fields Hw1'(ta) and Hw1'(t) satisfying Hw1'(ta)=σw'(ta)/2Ms1'(ta)h1' and Hw1'(t)=σw'(t)/2Ms1'(t)h1', and where h2 indicates a thickness of the recording layer, Hc2(ta) a coercive force of the recording layer at the room temperature (ta), Ms2(ta) a saturation magnetization of the recording layer at the room temperature, Hc2(t) a coercive force of the recording layer at the temperature (t), Ms2(t) a saturation magnetization of the recording layer at the temperature (t), Hw2(ta) an effective bias magnetic field applied to the recording layer from the readout layer at the room temperature, Hw2(t) an effective bias magnetic field applied to the recording layer from the readout layer at the temperature (t), the effective bias magnetic fields Hw2(ta) and Hw2(t) satisfying Hw2(ta)=σw'(ta)/2Ms2(ta)h2 and Hw2(t)=σw'(t)/2Ms2(t)h2.

According to the above arrangement of the first magneto-optical recording medium, an intensity of the light beam is so set that it is above the established temperature at the area close to the center in the irradiated area(the area close to the center is called "a high-temperature area" hereinafter) and that it is substantially at room temperature at the area surrounding the high-temperature area(the area surrounding the high-temperature area is called "a low-temperature area" hereinafter) and information is reproduced while applying the external magnetic field which is so set as to be between H1 and H4 as described in the first method for reproducing information as described above. Therefore, information can be reproduced only from the high-temperature area in the light beam.

Namely, in the low-temperature area, by applying the external magnetic field Hr which is larger than the magnetic field Hi, the magnetization direction of the readout layer is reversed against the magnetization direction of the recording layer even if the magnetization direction of the recording layer is different from the direction of the external magnetic field Hr. Accordingly, the magnetization direction of the readout layer is arranged to the direction of the external magnetic field Hr, so the information recorded in the recording layer is masked.

On the other hand, in the high-temperature area, even if the external magnetic field Hr is applied as well as in the low-temperature area, the external magnetic field Hr is smaller than the magnetic field H4. Therefore, the magnetization direction of the readout layer, which is arranged to the external magnetic field Hr at passing the low temperature range, is reversed to the direction of the magnetization of the recording layer against the external magnetic field Hr at a portion facing the magnetization direction of the recording layer. Then, information in the recording layer is transcribed to the readout layer.

Thus, information reproducing is made as follows: the information in the recording layer is transcriped to the readout layer only at the area close to the center in the area irradiated with a light beam by applying a single external magnetic field Hr to the area irradiated with the light beam, while the information in the surrounding area of the recording layer is masked. Therefore, resolution during reproducing is improved, so crosstalk becomes not to be increased even if the track pitch is narrow. Accordingly, recording density in the direction perpendicular to the track as well as the direction of the track running can be improved in comparison with conventional magneto-optical recording media.

Moreover, as the above-described improvement can come true without a magnetic field for initializing, a magneto-optical recording apparatus can be made small and electric power consumption can be decreased.

Furthermore, in the arrangement of the third magneto-optical recording medium, there is provided the intermediate layer inhibiting the effective bias magnetic field from the recording layer for the readout layer at room temperature. Therefore, since the H1 grows small, the external magnetic field Hr can be smaller according to the H1. Accordingly, since parts for generating the external magnetic field can be smaller, the magneto-optical recording apparetus can be made smaller and electric power consumption can be more decreased.

The first magneto-optical recording medium can be arranged, for example, by preparing such a medium to satisfy the equation between the readout layer and the recording layer like the arrangement of the second magneto-optical recording medium. Similarly, the first magneto-optical recording medium can be arranged, for example, by preparing such a medium to satisfy the equation between the recording layer and the double layer film consisting of both the readout layer and the intermediate layer like the arrangement of the fourth magneto-optical recording medium. Moreover, in this case, information is reproduced by detecting a change of the light beam according to the magnetization direction of the readout layer with applying the external magnetic field Hr which satisfies the condition defined in the second or the third method of reproducing information, substantially uniformly to the whole area irradiated with the light beam. Therefore, recording density can be improved and a magneto-optical recording apparatus can be made small and electric power consumption can be decreased by decreasing the external magnetic field.

Note that Hc1(ta)+Hw1(ta) corresponds to H1 and −Hc1(t) +Hw1(t) corresponds to H4 in the arrangement of the second magneto-optical recording medium. Simillarly, Hc1'(ta) Hw1'(ta) corresponds to H1 and −Hc1'(t)+Hw1'(t) corresponds to H4 in the arrangement of the fourth magneto-optical recording medium. In the arrangement of the second and third method of reproducing information, the inequalities Hr<Hc2(ta)−Hw2(ta) and Hr<Hc2(t)−Hw2(t) is the conditions to keep the magnetization direction of the recording layer not to be turned over in spite of applying the external magnetic field Hr. By satisfying this condition furthermore, a stable reproducing motion can be kept since the recorded information is not destroyed by the external magnetic field Hr.

On the other hand, like the arrangement of the fifth magneto-optical recording medium, by arranging the intermediate layer with a single-layered magnetic layer whose magnetization direction changes from the in-plane direction to the perpendicular direction according to the temperature rising from the room temperature, the effective bias magnetic field from the recording layer to the readout layer is more certainly suppressed at room temperature. Therefore, since the external magnetic field Hr to be applied during reproducing can be made smaller, a magneto-optical recording apparatus can be made small and electric power consumption can be decreased.

BRIEF DESCRIPTION OF THE DRAWINGS

FIG. 19(a) is a graph showing a temperature dependency of a corecive force and Kerr hysteresis loops at representative temperatures for magnetic properties of the readout layer as a single layer in the above-described magneto-optical disk, and FIG. 19(b) is an explanatory figure showing a structure of a sample made for mesureing the above-described properties.

FIG. 28 is a graph showing a temperature dependency of a corecive force and Kerr hysteresis loops at representative temperatures of the intermediate layer as a single layer in a magneto-optical disk in another embodiment of the present invention.

DETAILED DESCRIPTION OF THE PREFERRED EMBODIMENTS

Refering to FIGS. 1 through 11, the following description will discuss a first embodiment of the present invention.

Figure 1:
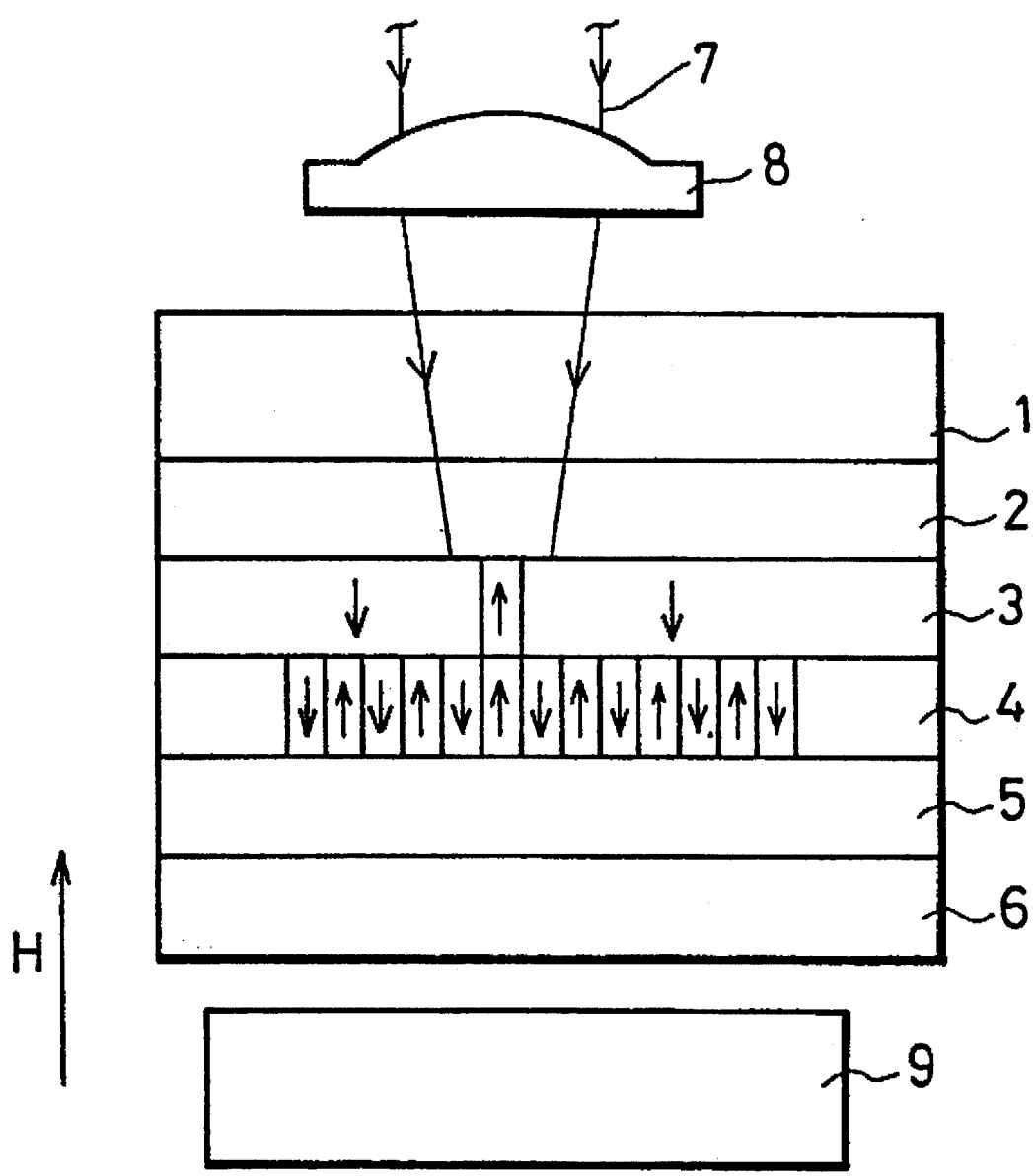
FIG. 1 is a explanatory figure showing the outline structure of a magneto-optical disk in one embodiment of the present invention and reproducing motion.
Figure 2:
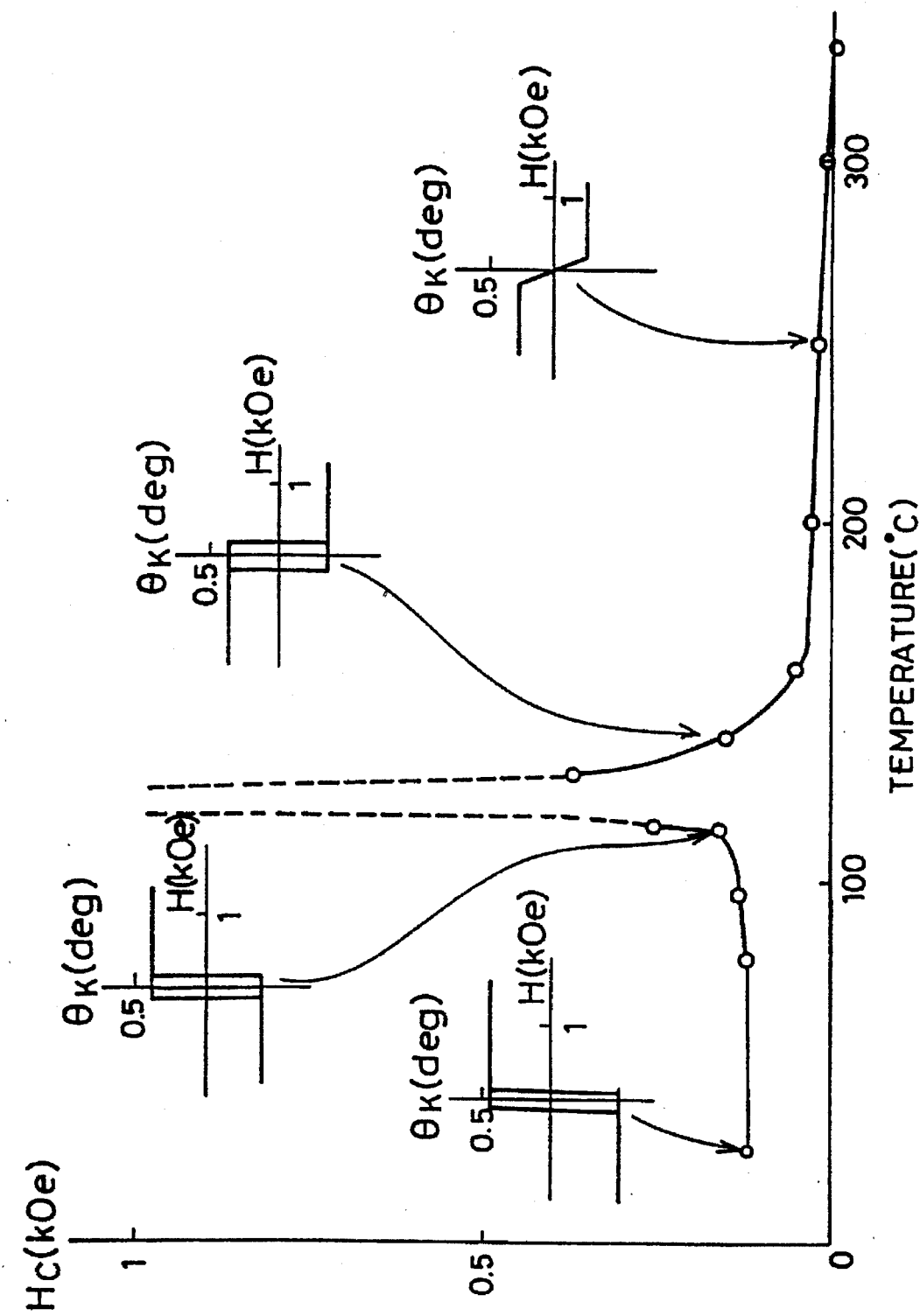
FIG. 2 is a graph showing a temperature dependency of a corecive force in case a readout layer used in the magneto-optical disk shown in the FIG. 1 is a single layer and Kerr hysteresis loops at representative temperatures.

As shown in FIG. 1, a magneto-optical disk as a magneto-optical recording medium in accordance with the present embodiment comprise a substrate 1, a transparent dielectric layer 2, a readout layer 3, a recording layer 4, a protective layer 5, and an overcoat layer 6 laminated in this order.

A GdFeCo rare earth-transition metal alloy being a ferri magnetic material is used in the readout layer 3, and a sub-lattice magnetization of the rare earth metal and a sub-lattice magnetization of the transition metal couples with each other in anti-parallel direction. A temperature dependency of a corecive force(He) of the GdFeCo rare earth-transition metal alloy as a single layer with a thickness of 50 nm is as shown in the FIG. 2. The sub-lattice magnetization of the rare earth metal is larger than the sub-lattice magnetization of the transition metal at room temperature. The alloy has a compensation temperature at a vicinity of 130° C. and Curie temperature at 330° C. Since this layer has a comparatively small perpendicular magnetic anisotropy, its corecive force Hc at room temperature is comparatively small.

Some Kerr hysteresis loops at representative temperatures are shown in the figure.

Figure 3:
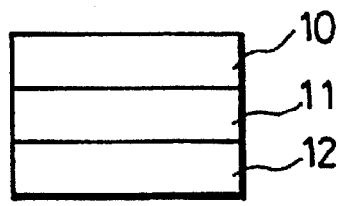
FIG. 3 is an explanatory figure showing a sample made for getting a result of mesurement shown in the FIG. 2.
Figure 4:
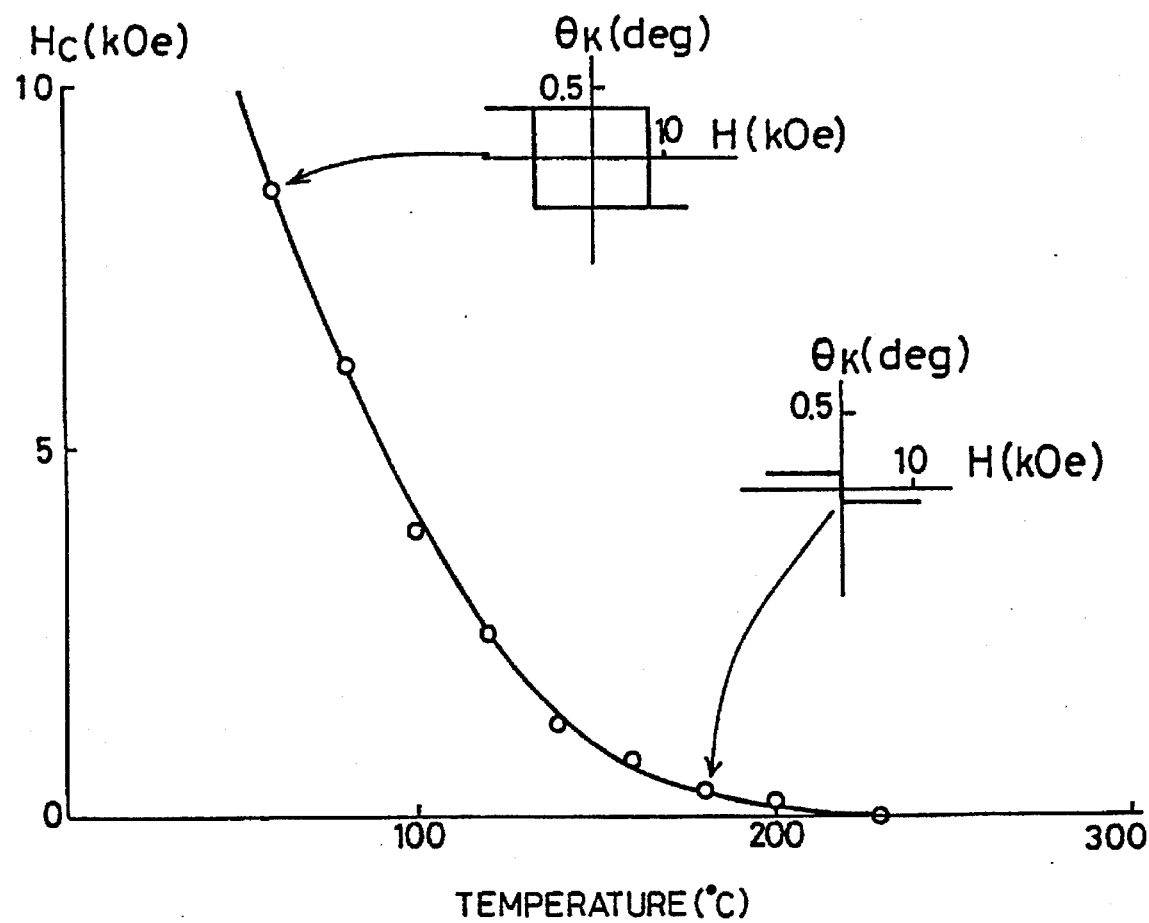
FIG. 4 is a graph showing a temperature dependency of a corecive force in case a recording layer used in the magneto-optical disk shown in the FIG. 1 is a single layer and Kerr hysteresis loops at representative temperatures.

The GdFeCo film used here shows substantially an inplane magnetization as a single layer when an external magnetic field is 0 and the temperature is not lower than 200° C., but shows a perpendicular magnetization at a low temperature. In addition, as shown in FIG. 3, a sample for getting such data was made with laminating a GdFeCo film with a thickness of 50 nm as a magnetic layer 11 and an AlN dielectric layer 12 with a thickness of 50 nm on a glass substrate 10, and the measurement was taken with irradiating a light beam with σ wave length of 633 nm from a side of the glass substrate 10.

A DyFeCo rare earth-transition metal alloy being a ferri magnetic material is used in the recording layer 4, and a sub-lattice magnetization of the rare-earth metal and a sub-lattice magnetization of the transition metal couples with each other in anti-parallel direction similarly to the readout layer 3. A temperature dependency of a corecive force(Hc) of the DyFeCo rare earth-transition metal alloy as a single layer with a thickness of 50 nm is as shown in the FIG. 4. The alloy has a compensation temperature at room temperature and Curie temperature at 230° C. Some Kerr hysteresis loops at representative temperatures are shown in the figure.

The DyFeCo film has a perpendicular magnetization direction from room temperature to its Curie temperature as a single layer.

A sample for getting such data was made with laminating a DyFeCo film with a thickness of 50 nm and an AlN dielectric layer 12 with a thickness of 50 nm on a glass substrate 10, and the measurement was taken with irradiating a light beam with oa wave length of 633 nm from a side of the glass substrate 10.

Figure 5:
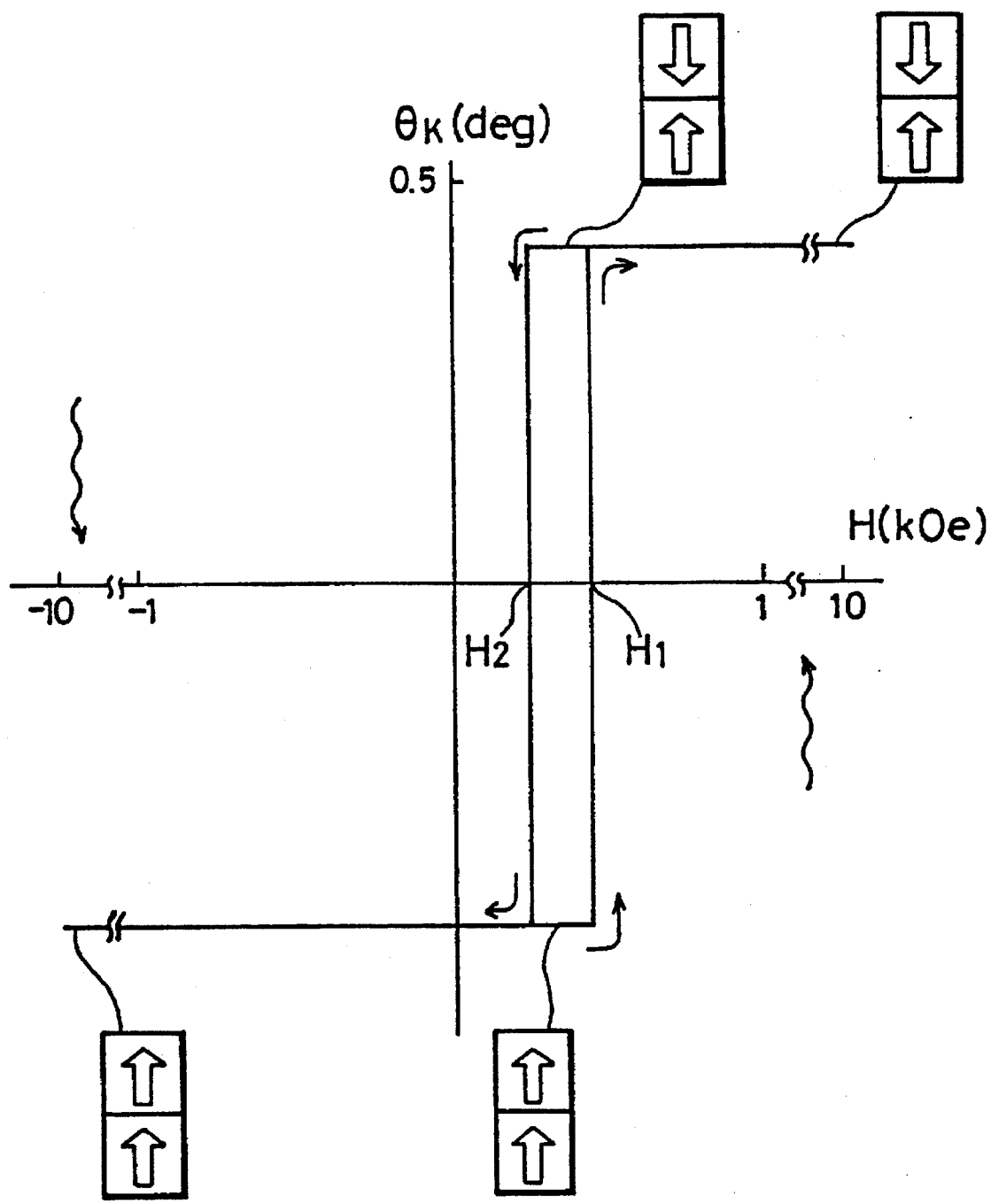
FIG. 5 is a graph showing a Kerr hysteresis loop at room temperature seen from a side of the readout layer in a magnetic double layer used in the magneto-optical disk shown in the FIG. 1.
Figure 6:
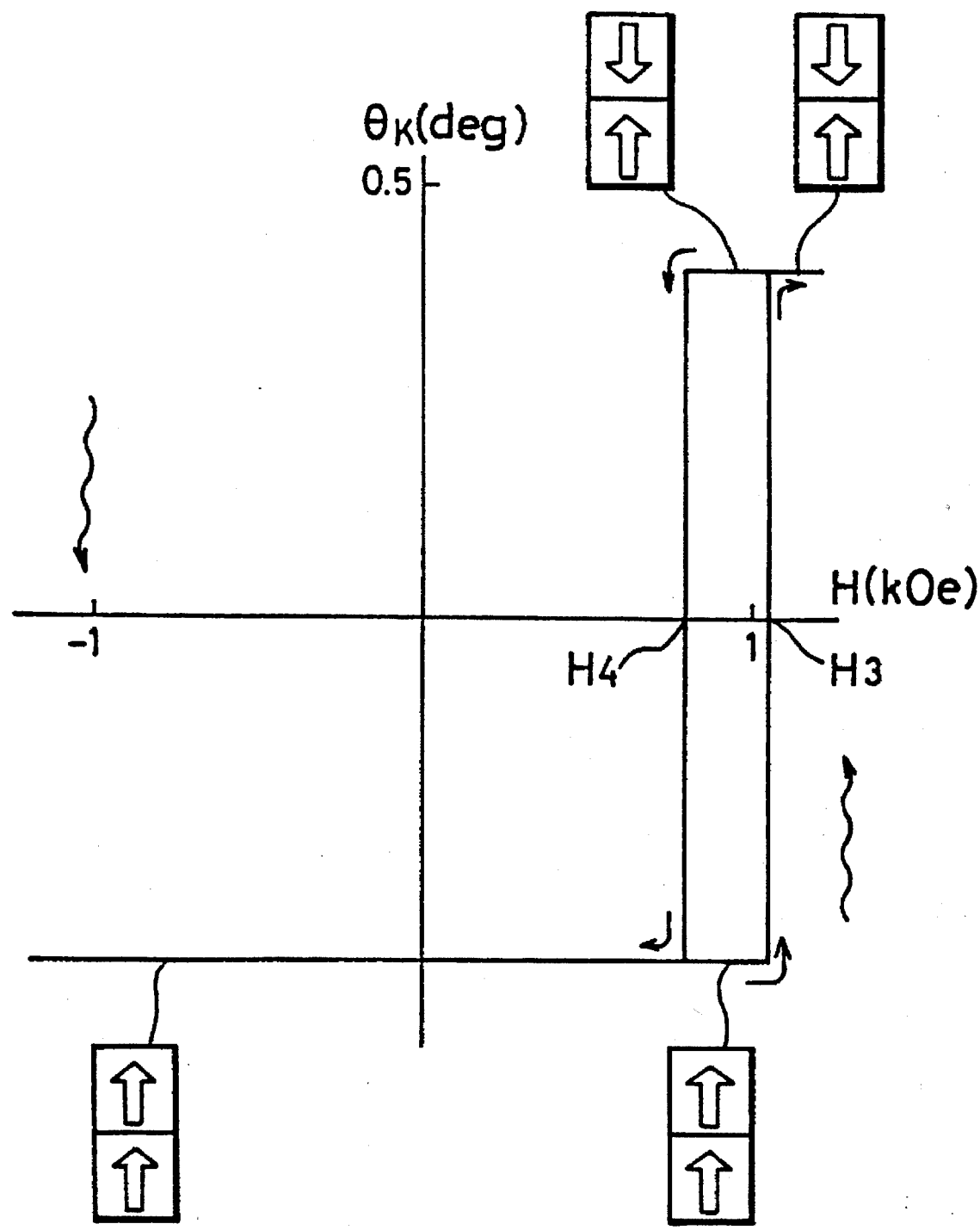
FIG. 6 is a graph showing a Kerr hysteresis loop at 120° C. seen from a side of the readout layer in the magnetic double layer used in the magneto-optical disk shown in the FIG. 1.
Figure 7:
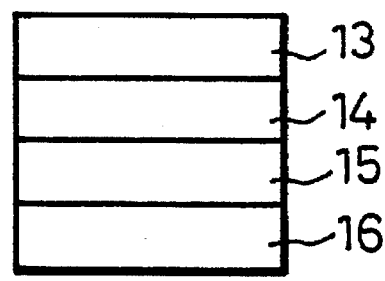
FIG. 7 is an explanatory figure showing a sample made for mesureing the Kerr hysteresis loop shown in the FIG. 5 and the FIG. 6.

FIGS. 5 and 6 show Kerr hysteresis loops at some representative temperatures seen from a side of the GdFeCo layer of a sample having a magnetic double layer laminated with the above-described GdFeCo layer and the DyFeCo layer with a respective thickness of 50 nm. As shown in FIG. 7, the sample was made with laminating a readout layer 14 consisting of the GdFeCo film, a recording layer 15 consisting of the DyFeCo layer, and an AlN dielectric layer 16 with a thickness of 50 nm on a glass substrate 13. The measurement was taken with irradiating a light beam with a wave length of 633 nm from a side of the glass substrate 13.

FIG. 5 shows the loop at room temperature, and FIG. 6 shows the loop at 120° C. The both figures show the relationship between an external magnetic field Hr applied in the perpendicular direction to the film of the sample shown in the FIG. 7 and a polar Kerr rotation angle(θ K) in case that light beam is irradiated in the direction perpendicular to the film. Each figure is described with canceling a Kerr effect due to the glass substrate. The arrows drawn with a solid line in the figures show directions to which the loop locuses are drawn. Futhermore, in the figures, the directions of the sub-lattice magnetization of the transition metal in the above-described magnetic double layer under some representative magnetic fields are drawn explanatorily. In the figure, the white arrows show the direction of the sub-lattice magnetization of the transition metal. Among the arrows, the above arrows show the direction of the sub-lattice magnetization of the transition metal of the readout layer 14, and the below arrows show the direction of the sub-lattice magnetization of the transition metal of the recording layer 15. The arrows drawn with a wave line show the direction of the external magnetic field H. Namely, when the external magnetic field H is positive, the external magnetic field H which directs upward perpendicularly to the film is applied, and when the external magnetic field H is negative, the external magnetic field H which directs downward perpendicularly to the film is applied. The white arrows showing direction of the sub-lattice magnetization of the transition metal are drawn according to the direction adopted in the external magnetic field H.

Apparent due to the FIG. 5, the sub-lattice magnetization of the transition metal of the readout layer 14(GdFeCo film) directs downward according to the external magnetic field H when the external magnetic field H having a value not smaller than H1 shown in the figure is applied perpendicularly upward at room temperature, and meanwhile directs upward according to the exchange-coupling force between the readout layer 14 and the recording layer 15 (DyFeCo film) when the external magnetic field H is not larger than H2. In additon, the sub-lattice magnetization of the transition metal of the recording layer 15 directs to a constant direction (upward in the figure) under all values of the external magnetic field H. That is because the recording layer 15 has a compensation temperature at room temperature.

FIG. 6 shows a Kerr hysteresis loop at changing the external magnetic field H in the range $-1.2 \leq H \leq 1.2$ (kOe).

At 120° C., the sub-lattice magnetization of the transition metal of the readout layer 14 directs downward according to the external magnetic field H when the external magnetic field H is not smaller than H3 shown in the figure, and meanwhile directs upward according to an exchange-coupling force between the readout layer 14 and the recording layer 15 when the external magnetic field H is not largrer than H4. In additon, all the sub-lattice magnetization of the transition metal of the recording layer 15 are drawn as an upward direction. That is because the directions of the arrows show that the magnetization direction of the recording layer 15 does not turn over in the range $-1.2 \leq H \leq 1.2$ (kOe).

Figure 8:
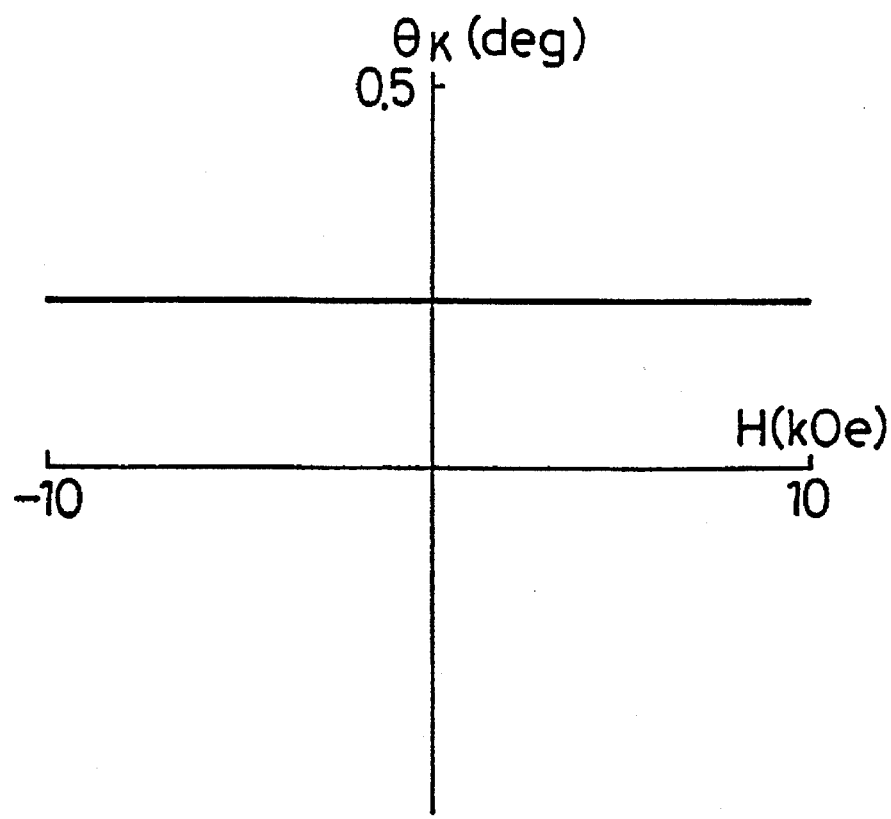
FIG. 8 is a graph showing a Kerr hysteresis loop at room temperature seen from a side of the recording layer in the magnetic double layer used in the magneto-optical disk shown in the FIG. 1.
Figure 9:
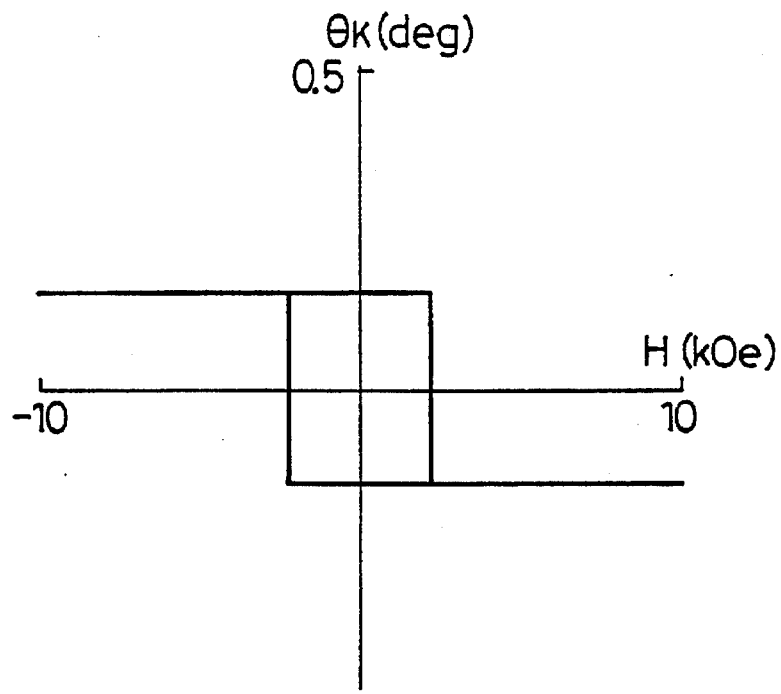
FIG. 9 is a graph showing a Kerr hysteresis loop at 120° C. seen from a side of the recording layer in the magnetic double layer used in the magneto-optical disk shown in the FIG. 1.

FIGS. 8 and 9 show a result of measuring the Kerr hysteresis loop of the recording layer 15 with irradiating the light beam with a wave length of 633 nm from the side of the AlN dielectric layer 16 to the sample used in the above-described measurement. The measurement shown in FIGS. 8 and 9 was taken under the external magnetic field H in the range $-10 \leq H \leq 10$ (kOe). FIG.8 shows the result at room temperature, and FIG. 9 shows the result at 120° C. The magnetization of the recording layer 15 did not turn over in the range $-10 \leq H \leq 10$ (kOe) at room temperature. The magnetization of the recording layer 15 turned over in the H of 2.2 (kOe) at 120° C.

The recording density of the magneto-optical disk can be improved due to adopting a method reproducing information with irradiating a laser beam under a proper external magnetic field and with a magnetic double layer having the above-described property. Namely, it is made possible to reproduce a recording bit smaller than a size of the light beam.

Refering to FIGS. 5 and 6, the following description will explain about this.

During reproducing, a reproducing light beam 7 shown in the FIG. 1 is irradiated from the side of the substrate 1 through an objective lens 8 to the readout layer 3. In the area of the readout layer 3 with irradiation of the reproducing light beam 7, it is the highest temperature at the area close to the center and is higher than the temperature of the area surrounding the above-described area. That is because a light strength distribution of the reproducing light beam 7 shows a Gaussian distribution since the reproducing light beam 7 is focused to the limit of diffraction, and because the temperature distribution on the irradiated area on the magneto-optical disk also shows a Gaussian distribution.

In case where the intensity of the reproducing light beam 7 is so set that the temperature of the area close to the center rises and that the temperature of the surrounding area is near room temperature, only the area close to the center, which area is smaller than the diameter of the light beam, is concerned to reproducing. Namely, the temperature-risen area close to the center in the readout layer 3 has such a property shown in FIG. 6, while in the surrounding area other than the area corresponding to the area close to the center of the reproducing light beam 7 in the readout layer 3, it is near room temperature and the area has such a property shown in FIG. 5. Therefore, when the external magnetic field Hr between H1 and H4 is applied by using a magnet 9, the following result is obtained: the sub-lattice magnetization of the transition metal of the above-described area close to the center in the readout layer 3 accords to the exchange-coupling force from the recording layer 4 because the external magnetic field Hr is smaller than H4, while the sub-lattice magnetization of the transition metal at the surrounding area in the readout layer 3 accords to the external magnetic field Hr appied by the magnet 9 because the external magnetic field Hr is larger than In this way, the magnetic double layers used in this embodiment needs to satisfy the condition $$H1<H4 \qquad (1)$$

Futhermore, when the external magnetic field Hr which satisfies the condition $$H1<Hr<H4 \qquad (2)$$

is applied to the magnetic double layers during reproducing, the information in the recording layer 4 is transcribed to the readout layer 3 only at the temperature-risen area which corresponds to the area close to the center of the reproducing light beam 7, so that only the area close to the center of the reproducing light beam 7 is concerned to reproducing information. In short, the sub-lattice magnetization of the transition metal of the readout layer 3 at the area other than the temperature-risen area acts so as to mask the information in the recording layer 4.

When the next recording bit is reproduced after the reproducing light beam 7 moves—actually the magneto-optical disk is rotated—the temperature of the already reproduced area falls to near room temperature, and the sub-lattice magnetization of the transition metal of the readout layer 3 does not accord to the sub-lattice magnetization of the transition metal of the recording layer 4 but directs to the perpendicular direction similarly to the sub-lattice magnetization of the transition metal in the area other than the temperature-risen area due to the external magnetic field Hr. Therefore, the previously reproduced area is masked.

The following description explains the condition to realize this phenomenon.

Here, the definition is made as follws: h1 indicates a thickness of the readout layer 3 consisting of GdFeCo film, h2 a thickness of the recording layer 4 consisting of DyFeCo film, Hc1(ta) a coercive force of the readout layer 3 at room temperature, Ms1(ta) a saturation magnetization of the readout layer 3 at room temperature, Hc2(ta) a coercive force of the recording layer 4 at room temperature, Ms 2(ta) a saturation magnetization of the recording layer 4 at room temperature, and σw(ta) a magnetic domain wall energy between the readout layer 3 and the recording layer 4 at room temperature. Similarly, Hc1(t) indicates a coercive force of the readout layer 3 at 120° C., Ms1(t) a saturation magnetization of the readout layer 3 at 120° C., Hc2(t) a coercive force of the recording layer 4 at 120° C., Ms2(t) a saturation magnetization of the recording layer 4 at 120° C., and σw(t) a magnetic domain wall energy between the readout layer 3 and the recording layer 4 at 120° C.

First, the relationship among Hi, H4, Hc1(ta), Hc1(t), Hw1(ta), and Hw1(t) is explained as follows.

Figure 10:
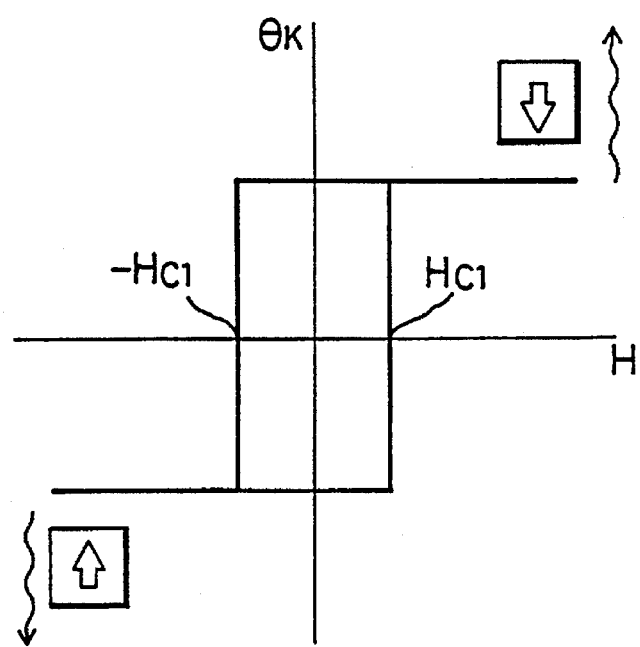
FIG. 10 is an explanatory graph showing a Kerr hysteresis loop at room temperature of the readout layer as a single layer.
Figure 11:
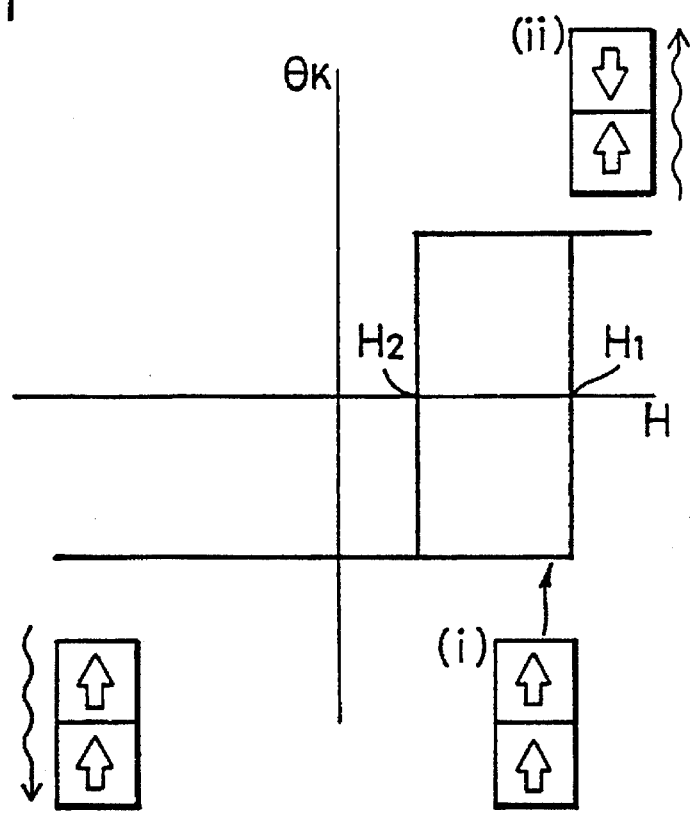
FIG. 11 is an explanatory graph showing a Kerr hysteresis loop at room temperature seen from a side of the readout layer in the magnetic double layer used in the magneto-optical disk shown in the FIG. 1.

FIG. 10 shows explanatorily a Kerr hysteresis loop of the readout layer 3 as a single layer at room temperature and FIG. 11 shows explanatorily a Kerr hysteresis loop of the magnetic double layer consisting of both the readout layer 3 and the recording layer 4 at room temperature. In the figures, the horizontal axis stands for the external magnetic field H applied in the direction perpendicular to the film and the perpendicular axis stands for the polar Kerr rotating angle θ k in case where a light beam is irradiated in the direction perpendicular to the film. The wave lines show the direction of the external magnetic field H and the white arrows show the sub-lattice magnetization of the transition metal. In the figure, the above arrows show the sub-lattice magnetization of the transition metal of the readout layer 3, while the below arrows show the sub-lattice magnetization of the transition metal of the recording layer 4.

In FIG. 11, when the external magnetic field H is so increased in the positive direction(upward in the figure) as to becomes Hi, the sub-lattice magnetization of the transition metal of each layer changes from the state (i) to the state (ii). Here, the state (i) stands for the state that the external magnetic field H has not become H1 yet so that the sub-lattice magnetization of the transition metal directs upward in the figure in both the readout layer 3 and the recording layer 4. The state (ii) stands for the state that the external magnetic field H has already become H1 so that the sub-lattice magnetization of the transition metal in the readout layer 3 directs reversely to the direction of the external magnetic field H while that of the recording layer 4 keep the same direction as it directed before the external magnetic field H has become H1.

Figure 12A:
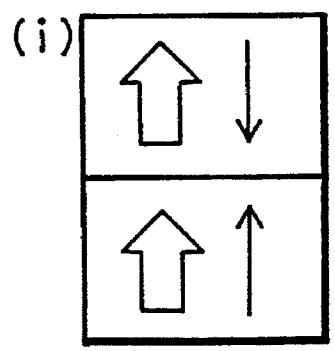
FIG. 12(a) and FIG. 12(b) are both explanatory figures showing directions of a saturation magnetization and a sub-lattice magnetization of a transition metal.
Figure 12B:
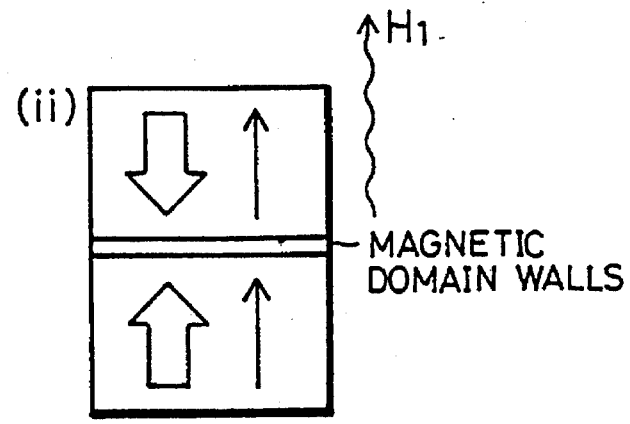

FIG. 12(a) and FIG. 12(b) show respectively the detail about the states(i) and(ii) which stand respectively for the state before the above-described transition and for the state after it. Here, the black arrows in the figures show the direction of the total magnetization(saturation magnetization).

In the readout layer 3, the saturated magnetization Ms1 (ta) directs reversely to the direction of the sub-lattice magnetization of the transition metal since the sub-lattice magnetization of the rare-earth metal is larger than the sub-lattice magnetization of the transition metal. Meanwhile, in the recording layer 4, the saturation magnetization Ms2(ta) directs in the same direction as the sub-lattice magnetization of the transition metal since the sub-lattice magnetization of the transition metal is larger than the sub-lattice magnetization of the rare-earth metal.

Here, when E1 indicates the energy of the state (i). the following equation is obtained:

$$E1=Ms1(ta)h1H1-Ms2(ta)h2H1.$$

Meanwhile, when E2 indicates the energy of the state (ii), the following equation is obtained:

$$E2=-Ms1(ta)h1H1-Ms2(ta)h2H1+σw(ta).$$

Therefore, the energy difference E12 occurred at transition from the state(i) to the state(ii) is obtained as follows:

$$E12=E1-E2=2Ms1(ta)h1H1-σw(ta) \qquad (3)$$

Since this energy difference causes turning over of the magnetization in the readout layer 3, the following equation is obtained:

$$E12=2Ms1(ta)h1Hc1(ta) \qquad (4)$$

Therefore, the equation (3) and (4) leads to the result:

$$H1=Hc1+σw(ta)/2Ms1(ta)h1.$$

Here, when the definition is made as folows:

$$Hw1(ta)=σw(ta)/2Ms1(ta)h1,$$

the following equation is obtained:

$$H1=Hc1(ta)+Hw1(ta) \qquad (5)$$

Meanwhile, since H2 is smaller than H1 by 2 Hc1(ta), the following equation is obtained:

$$H2=-Hc1(ta)+Hw1(ta) \qquad (6)$$

Apparent due to the equations (5) and (6), the Kerr hysteresis loop shown in FIG. 11 is a figure obtained with the Kerr hysteresis loop shown in FIG. 10 moved in the right direction by Hw1(ta). Accordingly, the above-described Hw1(ta) is called "an effective bias field".

Since the above-described content is realized at 120° C., too, when the definition is made as follows:

$$Hw1(t)=\sigma w(t)/2Ms1(t)h1,$$

the following equations are obtained similarly:

$$H3=Hc1(t)+Hw1(t),$$

and $$H4=-Hc1(t)+Hw1(t) \qquad (7)$$

In this way, the relationship among H1, H4, Hc1(ta), Hc1(t), Hw1(ta), and Hw1(t) is obtained as shown in the equations(5) and(7).

Substituting the equations (5) and (7) to the above-described (2), the following inequalities are obtained:

$$Hc1(ta)+Hw1(ta)<Hr<-Hc1(t)+Hw1(t) \qquad (8)$$

so the range of the external magnetic field Hr is set up according to the magnetic property of the magneto-optical disk.

In addition, the magnetic double layer settled in the magneto-optical disk needs to satisfy the inequality:

$$Hc1(ta)+Hw1(ta)<-Hc1(t)+Hw1(t) \qquad (9)$$

FIG. 1 shows a condition during reproducing with using both the magneto-optical disk which has a magnetic double layer satisfying the inequality (9) and the external magnetic field Hr satisfying the inequality (8). In the figure, the arrows drawn inside the readout layer 3 and recording layer 4 show the sub-lattice magnetization of the transition metal in each layer, and tell that the information written in the recording layer 4 is transcripted to the readout layer 3 only at an area where the temperature has risen. Meanwhile, at a room-temperature area other than the area close to the center of the light beam, the sub-lattice magnetization of the transition metal of the readout layer 3 directs all equally in the perpendicular direction (downward in the figure) due to the external magnetic field Hr applied upward, so the information written in the recording layer 4 is masked.

Therefore, information becomes not to be reproduced from an area where it becomes a low temperature, and invasion of a signal from neighboring bits, which is a cause of a noise, disappeares. However, the external magnetic field Hr needs to be such a value not to destroy the information in the recording layer 4.

By the way, when the following definition is made:

$$Hw2(ta)=\sigma w(ta)/2Ms1(ta)h2,$$

and $$Hw2(t)=\sigma w(t)/2Ms1(t)h2,$$

an external magnetic field which would make the magnetization of the recording layer 4 turn over near at room temperature is Hc2(ta)−Hw2(ta), and an external magnetic field which would make the magnetization of the recording layer 4 turn over in a high temperature due to the irradiation of the reproducing light beam 7 is Hc2(t)−Hw2(t). For this reason, the external magnetic field Hr to be applied during reproducing needs to be smaller than these values.

Accordingly, the external magnetic field Hr needs to satisfy the following inequaries:

$$Hr<Hc2(ta)-Hw2(ta) \qquad (10)$$

and $$Hr<Hc2(it)-Hw2(t) \qquad (11)$$

After all, the above-described inequalities (8), (9), (10), and (11) are the conditions which the magneto-optical disk and the external magnetic field Hr during reproducing need to satisfy. FIGS. 5 and 6 show the folloing results $$Hc1(ta)+Hw1(ta)=450(Oe)$$

and $$-Hc1(120° C.)+Hw1(120° C.)=800(Oe)$$

in the magnetic double layer used in this embodiment, so the inequality(9) is satisfied.

On the other hand, FIGS. 8 and 9 show the following inequality and the equation:

$$Hc2(ta)-Hw2(ta)>10(kOe)$$

and $$Hc2(120° C.)-Hw2(120° C.)=2.2(kOe).$$

Then, it is proved that the external magnetic field Hr which satisfies the inequality 450<Hr<800 (Oe) satisfies the inequalities (8), (10), and (11).

As above-described, it is made possible to reproduce a recording bit confirmly which is smaller than the diameter of the reproducing light beam 7 by reproducing an information with a proper laser power under a proper external magnetic field Hr with using the magneto-optical disk which has a magnetic double layer and satisfies the above-described conditions in this embodiment. Furthermore, the recording density can be remarkablly improved because of reproducing without any influence from a neighboring recording bit. Moreover, the apparatus using such a magneto-optical disk can be made small because a magnetic field for initializing is not necessary.

Next, the following description explains a concrete sample of the above-described magneto-optical disk more detailedly.

A substrate 1 consists of a disk-shaped glass substrate with an outer diameter of 86 mm and an inner diameter of 15 mm and a thickness of 1.2 mm, and there is provided, not shown, a guide track with a pitch of 1.6 µm having a groove and a land for guiding a light beam on the surface of one side. The width of the groove is 0.8 µm and that of the land is 0.8 µm.

There is provided an AlN with a thickness of 80 nm as a transparant dielectric layer 2 on the surface of the side where the guide track is provided in this substrate 1.

There is provided a GdFeCo film with a thickness of 50 nm consisting of a thin rare earth-transition metal alloy film as a readout layer 3 on the transparant dielectric layer 2. The composition of the GdFeCo is $Gd_{0.22}(Fe_{0.82}Co_{0.18})_{0.78}$. The sub-lattice magnetization of the rare-earth metal is more predominant than that of the transition metal at room temperature in the readout layer 3, and its compensation temperature is near 130° C. and its Curie temperature is 330° C.

There is provided a DyFeCo film with a thickness of 50 nm consisting of a thin rare earth-transition metal alloy film as a recording layer 4 on the readout layer 3. The composition of the DyFeCo is $Dy_{0.25}(Fe_{0.83}Co_{0.17})_{0.75}$. The compensation temperature of the recording layer 4 is room temperature and its Curie temperature is 230° C.

As above-described, the combination of both the readout layer 3 and the recording layer 4 leads to that the direction of the sub-lattice magnetization of the transition metal in the readout layer 3 accords to the external magnetic field at room temperature when the external magnetic field Hr is not smaller than 450 (Oe) and accords to the exchange-coupling force from the recording layer 4 at 120° C. under the external magnetic field which is not larger than 800 (Oe).

There is provided an AlN film with a thickness of 20 nm as a protective layer 5 on the recording layer 4. There is provided a polyurethane acrylate-type ultra-violet hardened rasin with a thickness of 50 nm as an overcoat layer 6 on the protective layer 5.

The next description explains the experiment for realizing a performance with using the magneto-optical disk in the above-described arrangement and the result of the experiment.

The semiconducter laser of the optical pickup used in the experiment has a wave length of 780 nm and the numerical apeture (N.A.) of the objective lens is 0.55. First, a single frequency recording bit with length of 0.765 µm was recorded beforehand on the land which was located at 26.5 mm from the center of the above-described magneto-optical disk under the rotating speed of 1800 rpm (a linear speed of 5 m/sec). The recording was made as follows: First, the magnetization direction of the recording layer 4 was arranged in one direction, that is, was initialized, and then, fixing the direction of the external magnetic field for recording in the direction reverse to the initialized direction, recording was made with modulating the laser with a recording frequency which corresponds to the length of 0.765 µm(that is, about 3.3 MHz in this case). The recording laser power was about 8 mW.

Figure 13:
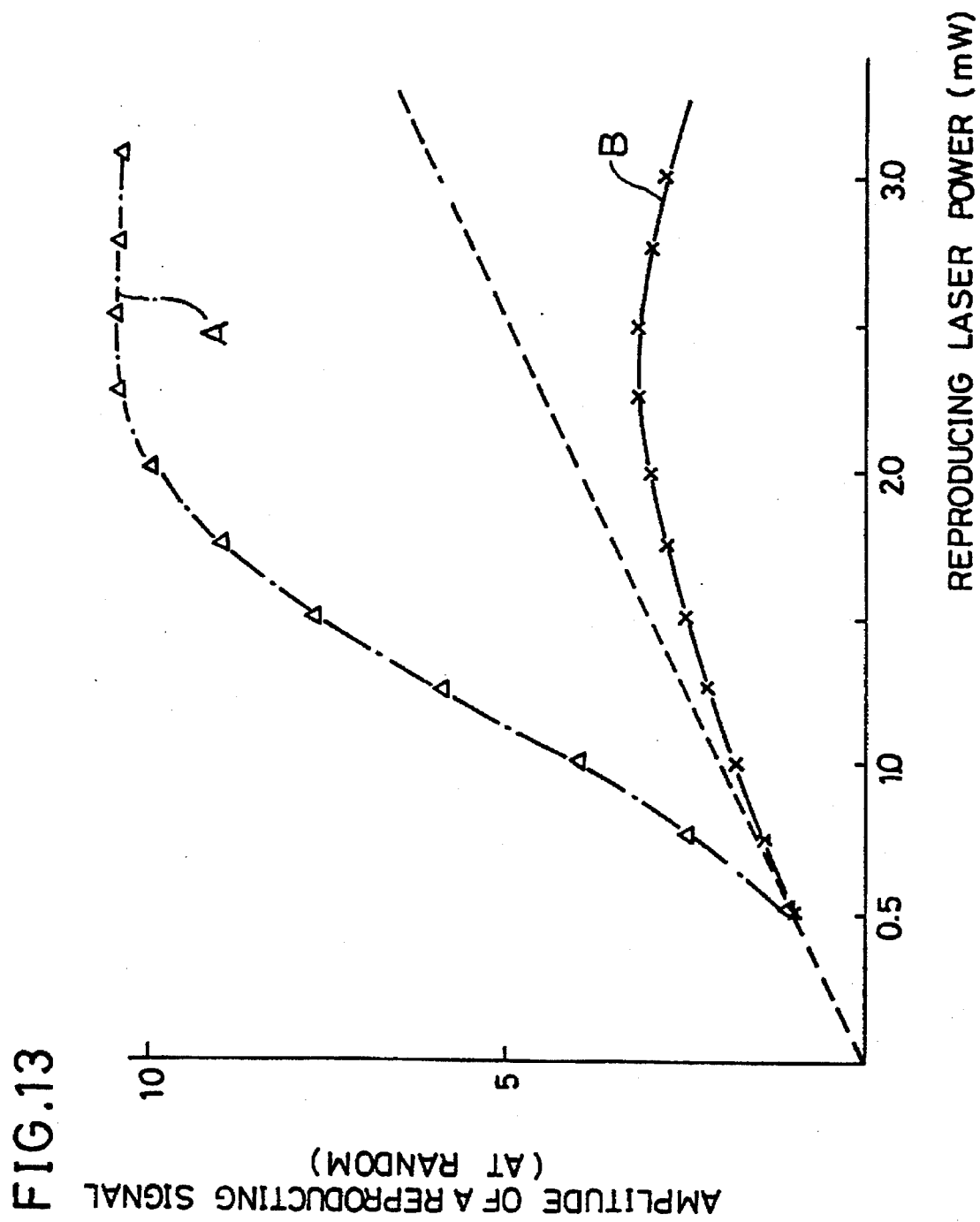
FIG. 13 is a graph showing a relationship between a reproducing power and an amplitude of a reproducing signal in the magneto-optical disk in the embodiment of the present invention and a conventional magneto-optical disk.

The recording bit recorded in this way was reproduced while changing a reproducing laser power and an external magnetic field to be applied during reproducing, and the amplitude of the reproduced signal was reserched. FIG. 13 shows the result.

In the figure, the horizontal axis stands for the reproducing laser power and the measurement was made in the range from 0.5 mW to 3.0 mW. The perpendicular axis stands for the amplitude of the reproduced signal, and the result is normalized with using the amplitude value obtained with the reproducing laser power of 0.5 mW. The curve named "A" shows the measured result in the magneto-optical disk in the present embodiment, and the external magnetic field Hr to be applied during reproducing was 650 (Oe). The curve named "B" shows the measured result in the conventional magneto-optical disk made for comparison.

The conventional magneto-optical disk was provided with an AlN layer with thickness of 80 nm, a DyFeCo layer with thickness of 20 nm, an AlN layer with thickness of 25 nm, and an AlNi layer with thickness of 30 nm on a glass substrate in this order, and there is provided an overcoat layer same as above-described on the AlNi layer. Namely, the conventional magneto-optical disk has such a structure: there is one DyFeCo layer consisting of a rare earth-transition metal alloy, which layer lies between the AlN layer that acts as a transparent dielectric layer and a protective layer, and then the AlNi layer which is a reflective layer is provided at last. This structure is called a reflective-layered structure and is a representative structure of the 3.5 inch-sized magneto-optical disk. Moreover, as known, a DyFeCo magnetic layer in the conventional magneto-optical disk has a perpendicular magnetization from room temperature to a high temperature. Note that there is not any external magnetic field during reproducing for the conventional magneto-optical disk.

The broken line drawn in the figure is a line that connects both the origin and the standard value of the amplitude at 0.5 mW and shows a proportional linear line standing for the relationship between both the signal amplitude and the reproducing laser power during reproducing the magneto-optical signal shown by the following expresstion:

(the reproduced signal amplitude) ∝ (the medium reflecting light amount)×(the polar Kerr lotating angle).

In this expression, the medium reflecting light amount is increased in proportion to the reproducing laser power and therefore can be replaced by the reproducing laser power.

In the figure, the measurement result curve B of the conventional magneto-optical disk is below the above-described proportional linear line for the following reason. Namely, when the reproducing laser power is increased, the medium reflecting light amount is increased according to the laser power, but on the other hand, the temperature of the magneto-optical disk rises. A magnetization of a magnetic material is decreased according to a rising temperature and becomes 0 at its Curie temperature. Therefore, the polar Kerr rotating angle is decreased according to the rising temperature in the conventioal magneto-optical disk. For this reason, the measurement result curve B is below the above-described proportional linear line.

Meanwhile, the measurement result curve A of the magneto-optical disk in this embodiment shows that the signal amplitude is abruptly increased so as to get above the above-described proportional linear line according to increase of the reproducing laser power. This shows that the amplitude of the reproducing signal is increased more than the increased amount of the reproducing laser power. This result reflects the layer-described property of the magnetic multi-layer structure having the above-described readout layer 3 and the recording layer 4, which is a double layer structure here, during reproducing under the above-described proper external magnetic field Hr. So this result supports the performance of the structure.

Namely, the above-described property means that the information recorded in the recording layer 4 is masked and is not reproduced due to the effect from both the external magnetic field Hr and the readout layer 3 at a low temperature and that the information is reproduced because the sub-lattice magnetization of the transition metal of the readout layer 3 accords to the sub-lattice magnetization of the transition metal of the recording layer 4, as the temperature rises.

The next description explains the result of reseaching the quality of the reproduced signal in case where the recording bit is smaller. Here it means improvement of the recording density to make possible to reproduce a smaller recording bit.

Figure 14:
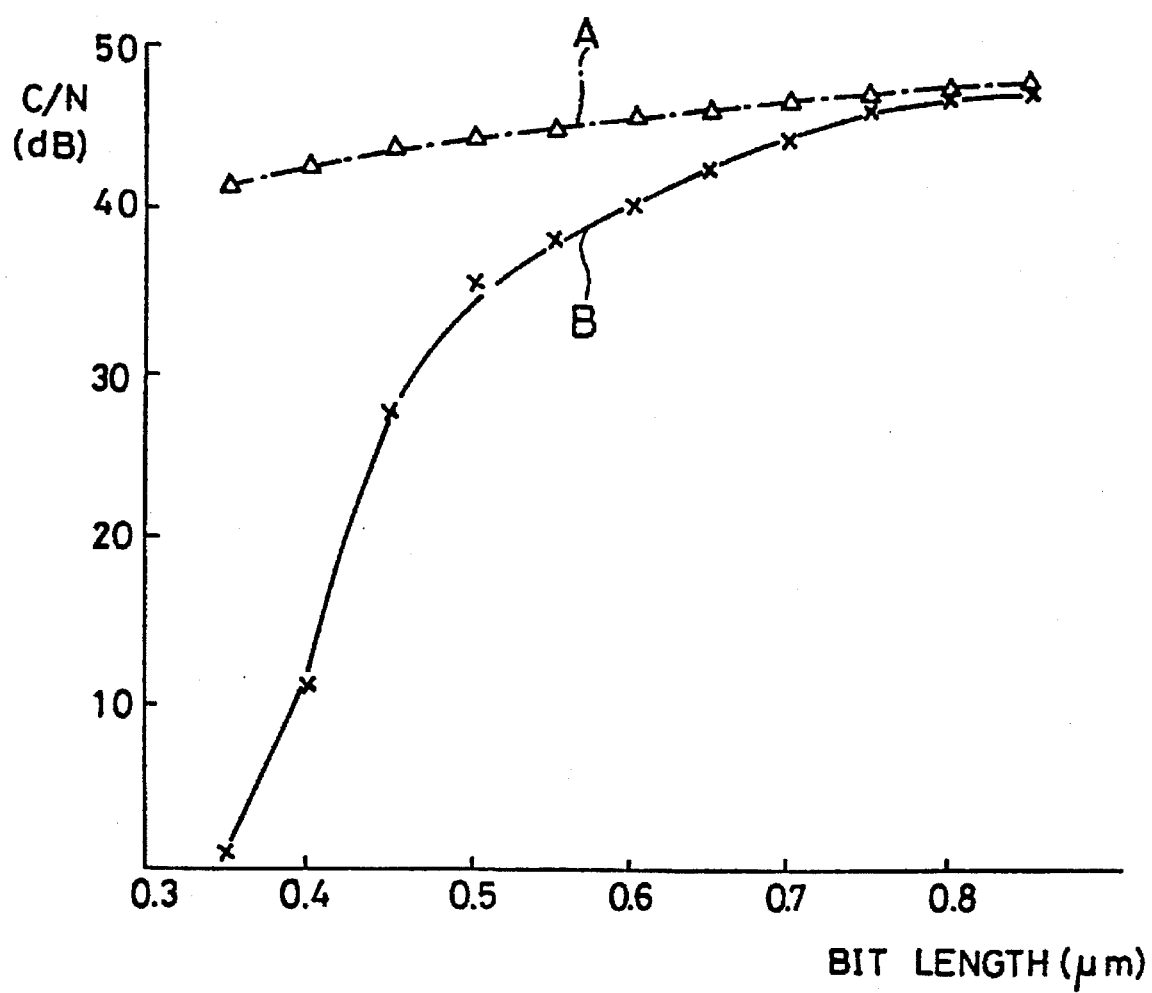
FIG. 14 is a graph showing a relationship between a length of a recording bit and an quality of a reproducing signal in the magneto-optical disk in the embodiment of the present invention and a conventional magneto-optical disk.

FIG. 14 shows the relationship between the length of the recording bit and the quality of the reproduced signal(C/N). In this experiment, the linear speed of the disk was set to 5 m/sec like the previous experiment, but the recording frequency at recording was changed from the previous experiment. Then the C/N was measured. The optical pickup and recording method other than the above-described are all the same as those of the previous experiment. In the figure, the curve named "A" shows the measurement result for the magneto-optical disk of the present embodiment, and the reproducing laser power was set to 3.0 mW and the external magnetic field Hr to be applied to the magneto-optical disk during reproducing was set to 650 (Oe). Meanwhile, the curve named "B" shows the measurement result for the conventional magneto-optical disk same as that used in the previous experiment, and the reproducing laser power was set to 1 mW and no external magnetic field was applied during reproducing.

There is little difference in C/N between the both disks in a long bit which has a recording bit length of longer than 0.7 µm, but there is a remarkable difference between both the measurement result curve A for the magneto-optical disk of the present embodiment and the measurement result curve B for the conventional magneto-optical disk in a recording bit length of not longer than 0.7 µm.

C/N is low in a recording bit length of not longer than 0.7 µm in the conventional magneto-optical disk. The reason for that is as follows: As the bit length is decreased, the number (area) of the bit existing inside the diameter of the area irradiated with the light beam is so increased that the individual bits become not to be distinguish each other.

The cutoff space frequency is one of the indicators showing the optical resolution of the optical pickup. This is defined by the wave length of the laser of the light source and the numerical aperture of the objective lens. Using the wave length (780 nm) of the laser of the optical pickup and the numerical aperture (0.55) of the objective lens used in this experiment, the cutoff space frequency is calculated. Converting it for the recording bit length, the following value was obtained:

$$780 \text{ nm}/(2\times 0.55)/2 = 0.355 \text{ µm}$$

In other words, the limit of the optical resolution of the optical pickup used in this experiment is a bit length of 0.355 µm. Reflecting this calculated result, C/N at 0.355 µm is substantially 0 in the above-described conventional magneto-optical disk.

Meanwhile, in the magneto-optical disk of this embodiment, though C/N is a little decreased as the bit length becomes small, C/N keeps a large value even at a bit shorter than 0.355 µm which is the optical resolution.

The above-described result confirms that a bit smaller than the optical deffraction limit can be reproduced with using the magneto-optical disk of this embodiment. Therefore, it is possible for the disk in this embodiment to improve the recording density remarkablly compared with the conventional magneto-optical disk.

Next description explains the experiment result about decrease of the amount of crosstalk, which is another important effect, in additioin to the recording density improving effect confirmed in the above-described experiment.

Generally, when a land-type magneto-optical disk is used, there is provided a guide track where the land width is made as large as possible and the groove width is made narrow, and only the land is used for recording and reproducing. Therefore, for example, crosstalk in the land-type disk is a signal leaked from bits recorded in the adjacent lands during reproducing a land. The circumstance is reverse in the groove-type disk.

IS 10089 standard, which is a standard defined about the ISO 5.25" rewritable optical disk, for example, prescribes that the amount of crosstalk is not more than −26 dB for the shortest recording bit(0,765 µm ) in the guide track having a pitch of 1.6 µm.

In this experiment, the magneto-optical disk provided with the above-described glass substrate having a land width of 0.8 µm and a groove width of 0.8 µm is used, so the amount of crosstalk from the adjacent grooves during reproducing the information in the land was measured.

Figure 15:
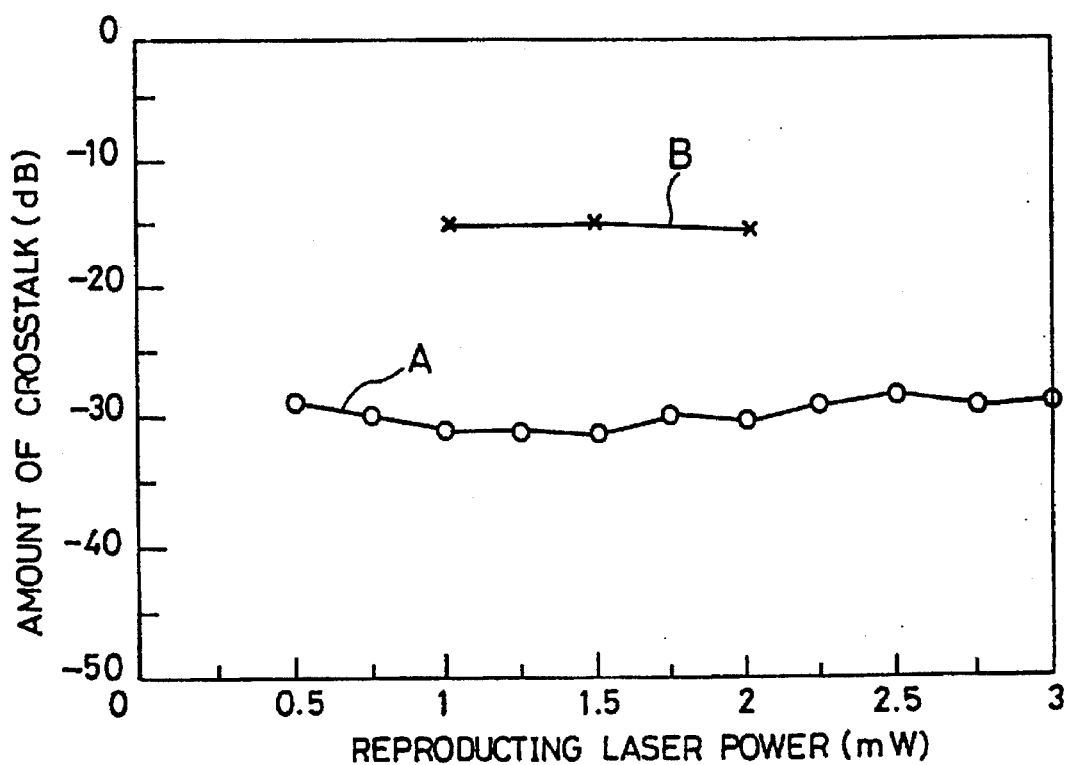
FIG. 15 is a graph showing a crosstalk amount in the magneto-optical disk in the embodiment of the present invention and a conventional magneto-optical disk.

FIG. 15 shows the measurement result in this experiment for the magneto-optical disk of this embodiment and the conventional magneto-optical disk. In this graph, the horizontal axis stands for the reproducing laser power and the perpendicular axis stands for the amount of the crosstalk. In the figure, the curve named "A" shows the measurement result for the magneto-optical disk of the present embodiment, and the reproducing laser power was set to 3.0 mW and the external magnetic field Hr to be applied during reproducing was set to 650 (Oe). Meanwhile, the curve named "B" shows the measurement result for the conventional magneto-optical disk same as that used in the previous experiment.

This graph makes clear the result that the amount of crosstalk is large as about −15 dB in the conventional magneto-optical disk(B), while the amount of crosstalk is 30 dB in the magneto-optical disk(A) of this embodiment. passing the value −26 dB which is predetermined in the above-described ISO standard.

Figure 16:
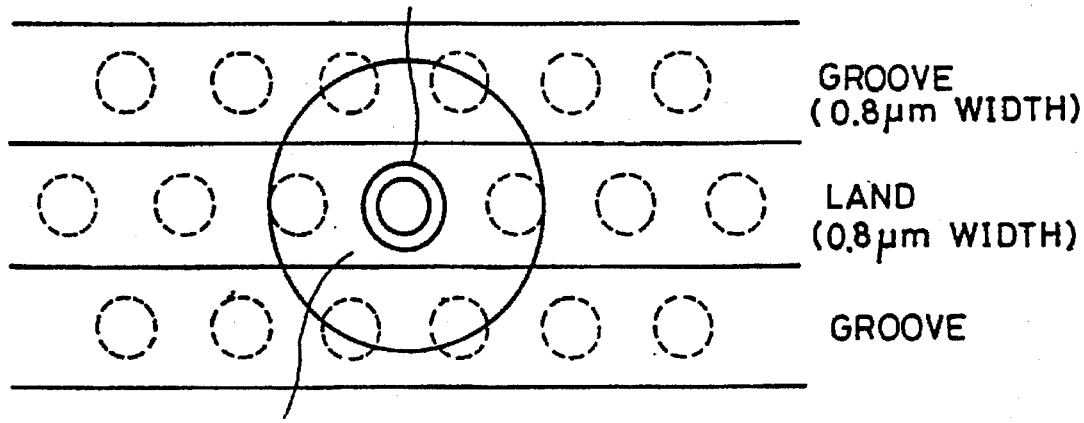
FIG. 16 is an explanatory figure showing a condition at reproducing in the magneto-optical disk in the embodiment of the present invention and a conventional magneto-optical disk.

The following description explains the reason such a result is obtained, reffering to FIG. 16.

FIG. 16 shows the top view in the production of the magneto-optical disk in this embodiment. There are some recording bits, which are drawn with a circle(a broken line), at both the land located in the center and the groove located in the adjacent positions. The larger circle in the figure (a solid line) stands for the focused light beam, and the light beam is under survo control for the land in the center in this case. In the figure, the land width and the groove width are both 0.8 µm and the diameter of the light beam is 1.73 µm. This figure is drawn with taking 0.355 µm for the recording bit diameter for convenience of explanation.

In the figure, there are seven recording bits in the light beam. The respective signal of bits in the light beam can not be separated in the conventional magneto-optical disk. This is the reason the good C/N is hardly obtained for the 0.35 µm recording bit and the crosstalk from the adjacent track is large in the conventional magneto-optical disk.

On the other hand, in the magneto-optical disk of this embodiment, the sub-lattice magnetization of the transition metal of the readout layer 3 acts according to the direction of the sub-lattice magnetization of the transition metal of the recording layer 4 (that is, the recorded information) only at the area close to the center of the light beam which is an area having a higher temperature than the surrounding area. Meanwhile, the sub-lattice magnetization of the transition metal of the readout layer 3 directs all equally in the perpendicular direction according to the external magnetic field Hr applied during reproducing at the area other than the center of the light beam.

Therefore, since only one bit located at the center of the light beam is concerned to reproducing even though there are seven bits in the light beam as above-described, a large C/N is obtained even though the bit is very small like 0.355 µm. Moreover, in the above-described FAD method, there is a problem of crosstalk from the adjacent track because the shape of the area concerned to reproducing is a crescent, while in this embodiment, there is very small crosstalk from the adjacent track because the shape of the area concerned to reproducing is substancially a circle as shown in the figure.

In this way, the above-described each experiment result confirms that the recording density in the beam running direction can be improved without using an initializing magnet and that the crosstalk does not increase even for a narrow track pitch, by using the magneto-optical disk having a magnetic double layer laminated the readout layer 3 and the recording layer 4 and irradiating the laser beam while applying the external magnetic field Hr having a strength in the above-described range during reproducing.

Note that the composition, the film thickness, and the kind of the alloys for both the readout layer 3 and the recording layer 4 are not limited to the above-described examples. Reffered to the point of the present invention, it is clear that the film thickness, the magnetic property, and the external magnetic field Hr applied during reproducing only have to satisfy the above-described inequalities (8), (9), (10), and (11). Here, the rare earth-transition metal alloy is a material where its corecive force, the magnetization, and the magnetic domain wall energy at the interface between the magnetic layers vary largely by changing a ratio of the rare earth-transition metal. Therefore, if the ratio of the rare-earth metal and the transition metal in the above-described GdFeCo and DyFeCo, the above-described H1 and H4 also change accordingly. Futhermore, it is a same circumstance in case where the film thickness is changed. Moreover, it is possible to change the kind of the rare earth-transition metal alloy to, for example, TbFeCo, GdTbFe, GdTbFeCo, GdDyFeCo, NdGdFeCo, and so on.

Refering to FIGS. 1 and 14, the following description will discuss a second embodiment of the present invention.

Eleven magneto-optical disk as magneto-optical recording medium shown in FIG. 1 were made similarly to the first embodiment. The compositionand the film thickness of each layer is the same as that in the first embodiment except the film thickness of the readout layer 3. H1 and H4 were reseached by using a Kerr hysteresis loops for the magneto-optical disks made by changing the film thickness h1 of the readout layer 3. Furthermore, a bit with a length of 0.45 μm was recorded in the magneto-optical disks and reproduced. The table 1 shows H1 and H4, the proper external magnetic field Hr, the reproducing power Pt, and C/N at the bit with length of 0.45 μm in the magneto-optical disks.

TABLE 1

| $h_1$ (nm) | $H_1$ (Oe) | $H_4$ (Oe) | H r (Oe) | Pr (mW) | C/N (dB) |
|---|---|---|---|---|---|
| 20 | 1000 | 2300 | 1500 | 3.0 | 46 |
| 30 | 700 | 1300 | 1100 | 3.0 | 45 |
| 50 | 450 | 800 | 650 | 3.0 | 44 |
| 60 | 400 | 680 | 550 | 3.0 | 43 |
| 70 | 350 | 600 | 500 | 3.0 | 42 |
| 80 | 310 | 550 | 450 | 3.0 | 36 |
| 90 | 280 | 500 | 350 | 3.0 | 34 |
| 100 | 250 | 450 | 350 | 3.0 | 33 |
| 120 | 220 | 400 | 300 | 3.0 | 32 |
| 150 | 200 | 350 | 300 | 3.0 | 30 |
| 200 | 150 | 250 | 200 | 3.0 | 10 |

The result tells that both H1 and H4 are decreased as the film thickness h1 of the readout layer 3 grows thicker. This is because Hw1 in the equations (5) and (7) grow smaller as h1 becomes larger. Hr also grows smaller then and the permitted range to satisfy the inequality H1<Hr<H4 also grows smaller accordingly.

Moreover, C/N grows smaller as h1 is increased. When h1 satisfies h1=150 nm, C/N is 30 dB, that is, substantially equal to the value at the 0.45 μm length bit in the curve B which shows the conventional magneto-optical disk in FIG. 14. When h1 satisfies h1=200 nm, C/N is inferrior even to the value in the curve B. Though it is not clear why C/N is decreased as h1 is increased, it is easy to expect the information in the recording layer 4 does not well transcripted to the upper surface of the readout layer 3 if h1 is large enough, for example, 10 cm. Therefore, the phenomenon that C/N is decreased can be understood qualitively.

Meanwhile, it is shown that C/N is more than 30 dB when h1 is not larger than 150 nm. Therefore, h1 is preferable set to not larger than 150 nm in order to obtain more conrfirmly the reproduced signal quality superior to the conventional magneto-optical disks.

The following description will discuss a third embodiment of the present invention.

Figure 18:
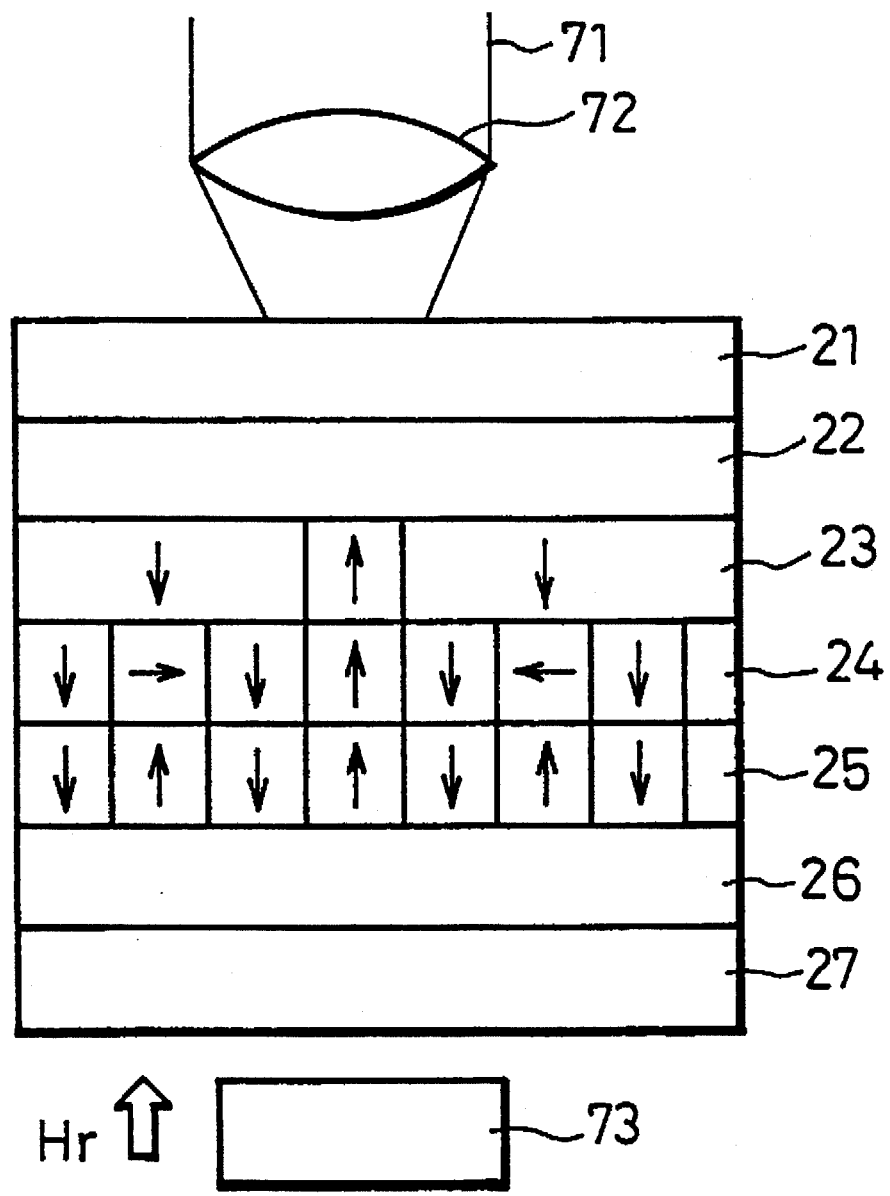
FIG. 18 is an explanatory figure showing a structure and a condition at reproducing in the above-described magneto-optical disk.

As shown in FIG. 18, the magneto-optical disk as the magneto-optical recording medium in the present embodiment has a structure having a substrate 21, a transparent dielectric layer 22, a readout layer 23, an intermediate layer 24, a recording layer 25, a protective layer 26, and an overcoat layer 27 in this order.

A substrate 21 consists of a disk-shaped glass substrate with an outer diameter of 86 mm and an inner diameter of 15 mm and a thickness of 1.2 mm. and there is provided, not shown, a guide track with a pitch of 1.6 μm. for example, having a groove and a land for guiding a light beam on the surface of the one side, which surface is an under surface in the figure. The width of the groove is 0.8 μm and that of the land is 0.8 μm.

The transparent dielectric layer 22, which is on the surface of the side where the guide track is provided in this substrate 21, consists of AlN, for example, and its thickness is 80 nm.

The above-described readout layer 23 with thickness of 50 nm is provided on the transparant dielectric layer 22. The readout layer 23 consists of a GdFeCo rare earth-transition metal alloy which is a ferri magnetic matirial, and the composition of the GdFeCo is $Gd_{0.22}(Fe_{0.82}Co_{0.18})_{0.78}$.

FIG. 19(a) shows the temperature dependency of the corecive force (Hc) of the GdFeCo rare earth-transition metal alloy as a single layer having a thickness of 50 nm. In the magnetic layer, the sub-lattice magnetization of the rare-earth metal is larger than that of the transition metal at room temperature. Its compensation temperature is substantially 170° C. and its Curie temperature is 330° C. As this magnetc layer has a comparatively small perpendicular magnetic anisotropy, Hc is also comparatively small.

Some Kerr hysteresis loops at representative temperatures are shown in the figure. Each figure of the Kerr hysteresis loops is described with canceling a Kerr lotation due to the substrate. As shown in FIG. 19(b), the material was made with laminating an A1N dielectric layer 32 with a thickness of 70 nm, a GdFeCo film with a thickness of 50 nm as a magnetic layer 33, and an A1N dielectric layer 34 with a thickness of 50 nm on a glass substrate 31, and these data was obtained by measuring with irradiating a light beam with a wave length of 633 nm to the material from a side of the glass substrate 31.

Figure 20:
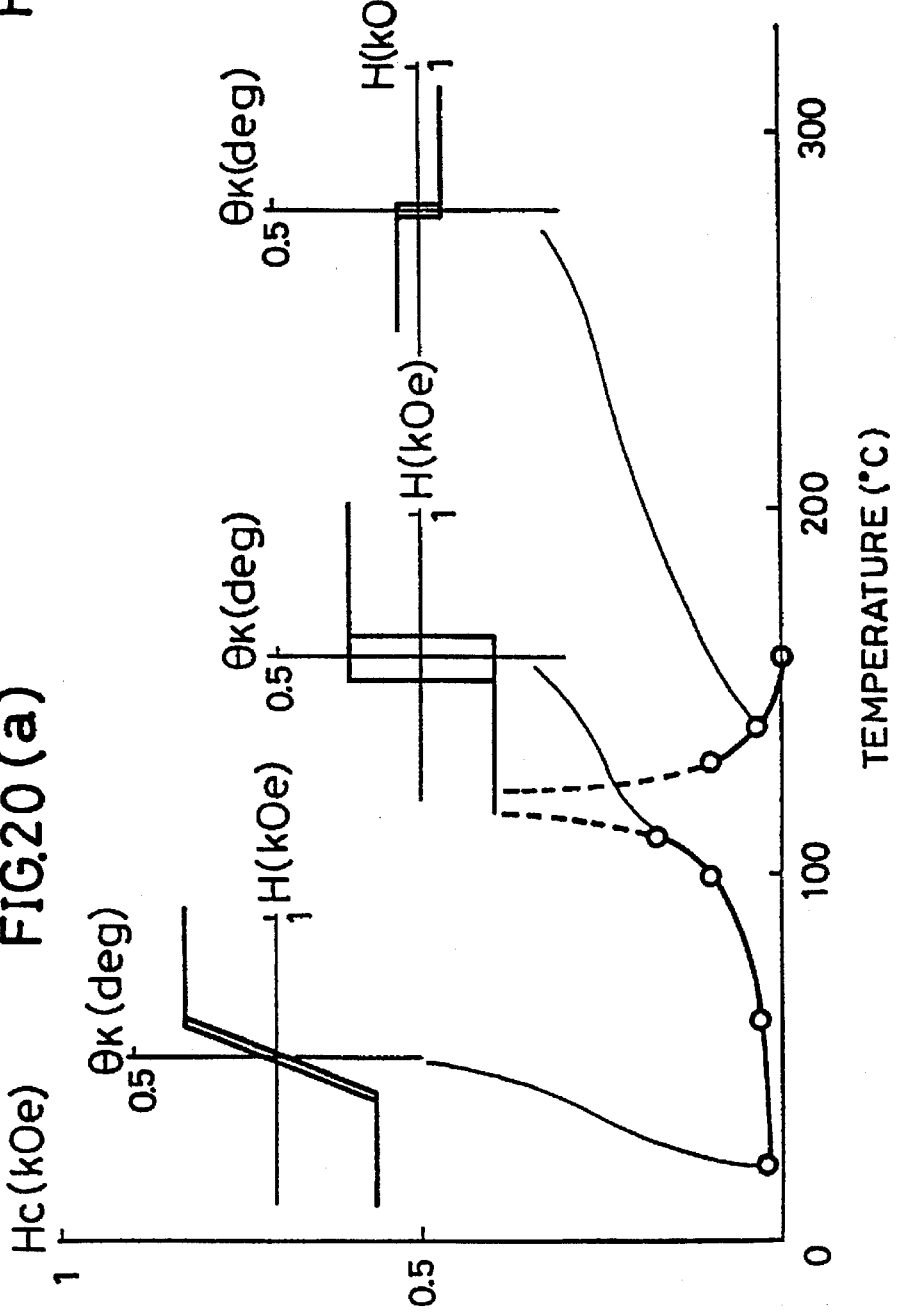
FIG. 20(a) is a graph showing a temperature dependency of a corecive force and Kerr hysteresis loops at representative temperatures for magnetic properties of the intermediate layer as a single layer in the above-described magneto-optical disk.
FIG. 20(b) is an explanatory figure showing a structure of a sample made for mesureing the above-described properties.
Figure 20:
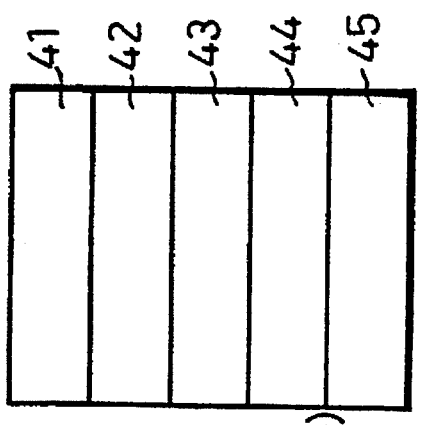

The intermediate layer 24, which is provided on the readout layer 23, consists of GdFeCoAl rare earth-transition metal alloy of a ferri magnetic material. Its thickness is 20 nm and its composition is $Gd_{0.20}(Fe_{0.82}Co_{0.18})_{0.75}Al_{0.05}$. FIG. 20(a) shows the temperature dependency of the corecive force(Hc) as a single layer of this GdFeCoAl alloy layer having thickness of 20 nm. Also in this magnetic layer, the sub-lattice magnetization of the rare-earth metal is more predominant than that of the transition metal, and its compensation temperature is 120° C. and its Curie temperature is 160° C. Some Kerr hysteresis loops at representative temperatures are shown in the FIG. 20(a). Each figure of the Kerr hysteresis loops described with canceling a Kerr rotation due to the substrate, same as the above-described.

The above-described GdFeCoAl film has a comparatively small perpendicular magnetic anisotropy, so Hc is comparatively small. As a single layer, the magnetization of this layer directs in the in-plane direction at room temperature and directs in the perpendicular direction at high temperature. As shown in FIG. 20(b), the matirial was made with laminating an AlN dielectric layer 42 with a thickness of 70 nm, a GdFeCoAl film with a thickness of 20 nm as a magnetic layer 43, an AlN dielectric layer 44 with a thickness of 50 nm, and an Al reflective layer 45 with thickness of 30 nm on a glass substrate 41, and this datum in the FIG. 20(a) was obtained by measuring with irradiating a light beam with a wave length of 633 nm to the matirial from a side of the glass substrate 41.

Figure 21A:
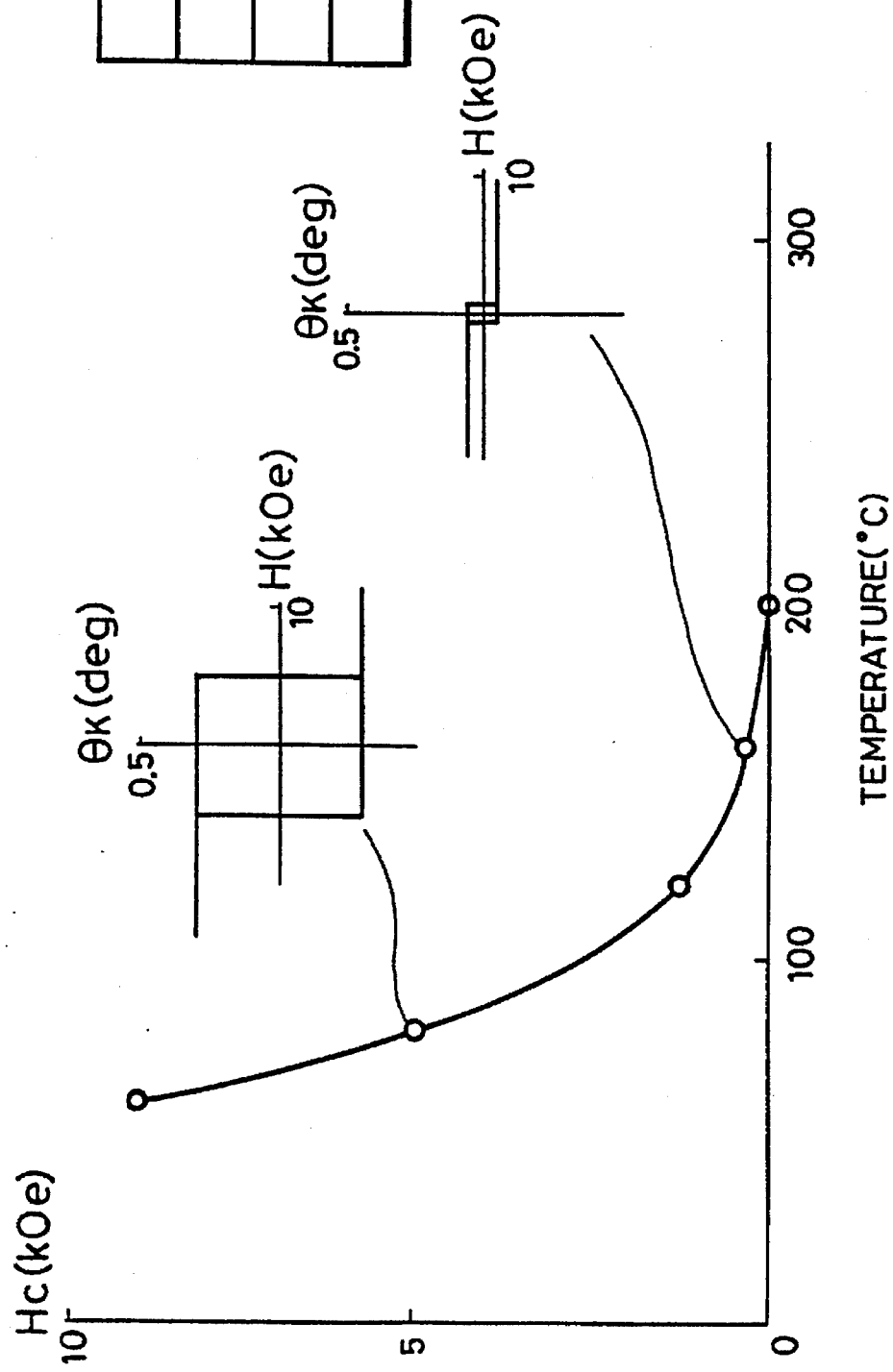
FIG. 21(a) is a graph showing a temperature dependency of a corecive force and Kerr hysteresis loops at representative temperatures for magnetic properties of the recording layer as a single layer in the above-described magneto-optical disk.

The recording layer 25, which is provided on the intermediate layer 24, consists of DyFeCo rare earth-transition metal alloy of a ferri magnetic material. Its thickness is 50 nm and its composition is $Dy_{0.25}(Fe_{0.84}Co_{0.16})_{0.75}$. FIG. 21(a) shows the temperature dependency of the corecive force(Hc) of this DyFeCo alloy layer having thickness of 50 nm. This magnetic layer has a compensation temperature at room temperature and its Curie temperature is 200° C. Some Kerr hysteresis loops at representative temperatures are shown in FIG. 21(a). Each figure of the Kerr hysteresis loops is described with canceling a Kerr rotation due to the glass substrate 41.

Figure 21B:
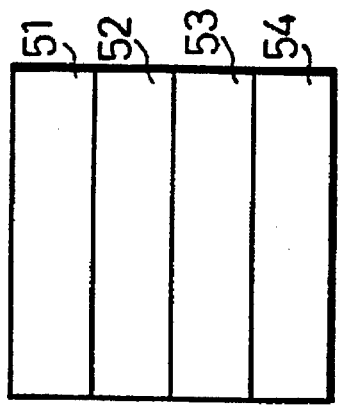
FIG. 21(b) is an explanatory figure showing a structure of a sample made for mesureing the above-described properties.

The magnetization directs in the perpendicular direction in the temperature range from room temperature to its Curie temperature in the above-described DyFeCo layer as a single layer. Its Hc is comparatively large since its perpendicular magnetic anisotropy is large. As shown in FIG. 21(b), the matirial was made with laminating an AlN dielectric layer 52 with a thickness of 70 nm, a DyFeCo film with a thickness of 50 nm as a magnetic layer 53, and an AlN dielectric layer 54 with a thickness of 50 nm on a glass substrate 51, and this datum in FIG. 21(a) was obtained by measuring with irradiating a light beam with a wave length of 633 nm to the material from a side of the glass substrate 51.

The porotective layer 26 consisting of AlN is provided with thickness of 20 nm on the recording layer 25, and the overcoat layer consisting of a polyurethane acrylate-type ultra-violet hardened rasin with a thickness of 5 μm on the protective layer 26. Thus, the magneto-optical disk having a section shown in FIG. 18 is arranged.

In this way, the magneto-optical disk of the present embodiment is arranged by providing the magnetic triple layer consisting of the magnetic layers which have the above-described magnetic properties as a single layer respectively, that is, the readout layer 23 consisting of a GdFeCo rare earth-transition metal alloy, the intermediate layer 24 consisting of a GdFeCoAl rare-earth metal transition metal alloy, and the recording layer 25 consisting of a DyFeCo rare earth-transition metal alloy.

Figure 22:
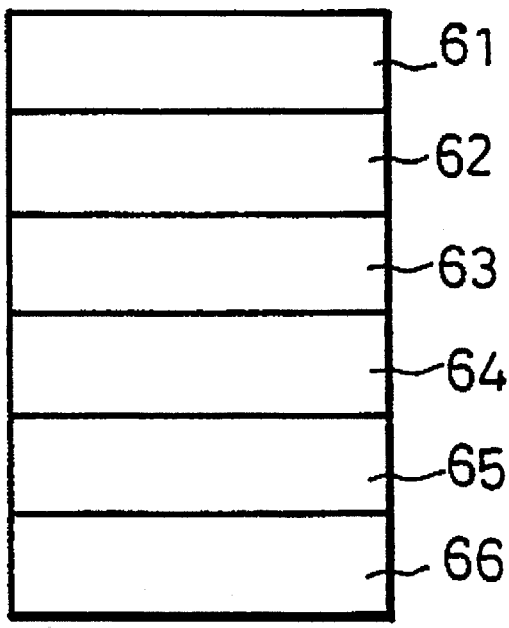
FIG. 22 is an explanatory figure showing a structure of a sample made for mesureing the Kerr hysteresis loop in the magnetic triple layer comprising the above-described readout layer, the intermediate layer, and the recording layer.

The following description explains the result of the measurement about the whole magnetic property in case the magneto-optical disk is arranged as this magnetic triple layer. As shown in FIG. 22, the sample was made which is laminated with an AlN dielectric mambrane 62 with thickness of 70 nm, a GdFeCo readout layer 63 with thicknes of 50 nm, a GdFeCoAl intermediate layer 64 with thickness of 20 nm, a DyFeCo recording layer 65 with thickness of 50 nm, and an AlN dielectric film 66 with thickness of 50 nm for this measurement.

Figure 17A:
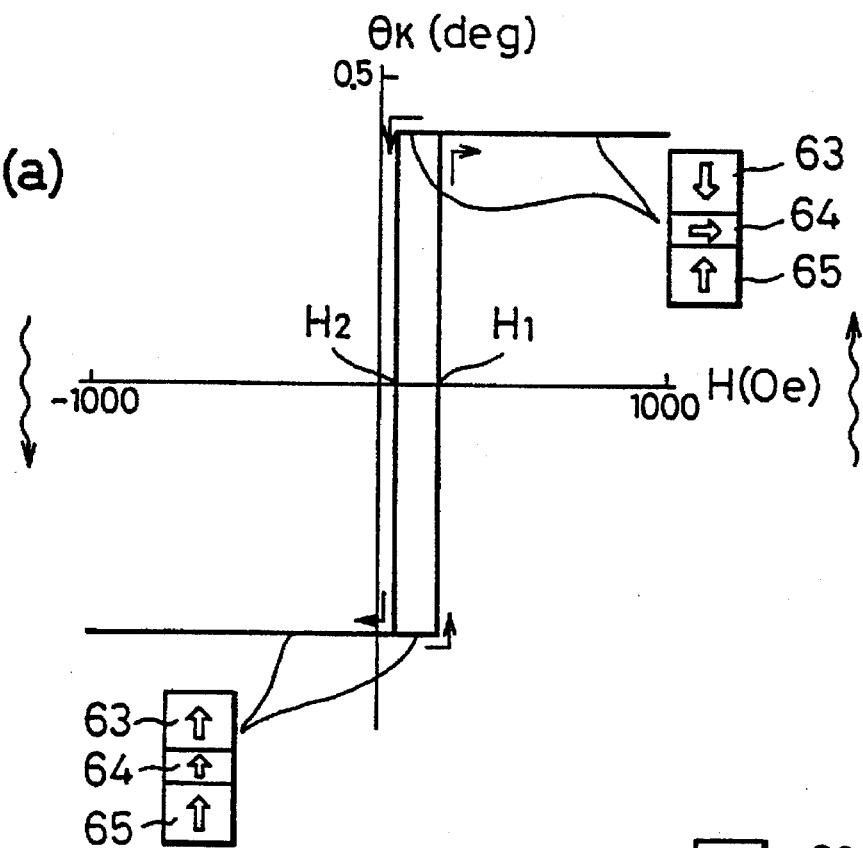
FIG. 17(a) is a graph showing a result of measurement of a Kerr hysteresis loop at room temperature seen from a side of the readout layer in a magnetic triple layer comprising the readout layer, an intermediate layer, and the recording layer used in a magneto-optical disk shown in another embodiment in the present invention.
Figure 17B:
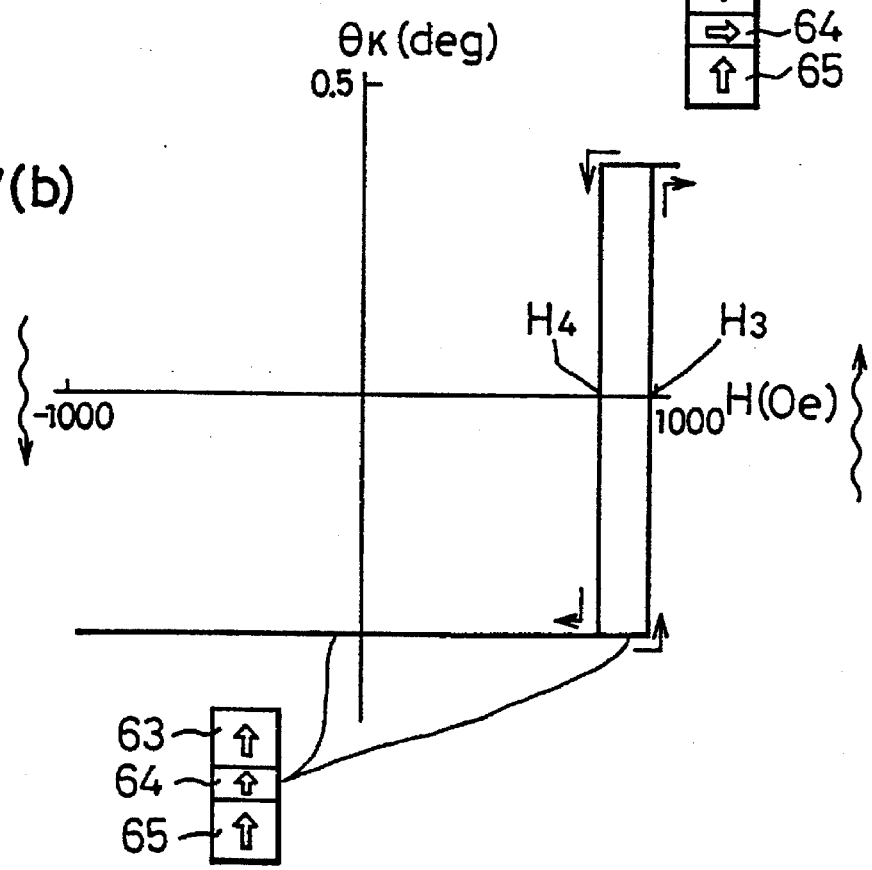
FIG. 17(b) is a similar graph at 100° C.

FIG. 17(a) and FIG. 17(b) show the Kerr hysteresis loops measured from the side of the glass substrate 61 in the above-described sample at room temperature and at 100° C. These show the relationship between both the external magnetic field H applied in the direction perpendicular to the film surface of the sample and the polar Kerr rotating angle(θ k) at irradiating a light beam in the direction perpendicular to the film surface. Each figure of the Kerr hysteresis loops described with canceling a Kerr rotation due to the glass substrate 61. The measurement was made with irradiating a light beam with a wave length of 633 nm and changing the external magnetic field H in the range from −1000 (Oe) to +1000 (Oe). FIG. 17(a) and FIG. 17(b) show the measured result at room temperature and at 100° C. respectively.

The arrows drawn with a solid line in the figures show directions to which the loop locuses are drawn. Futhermore, in the figures, the directions of the sub-lattice magnetization of the transition metal in the above-described magnetic triple layer under some representative magnetic fields are drawn explanatorily with the white arrows. The arrows in the highest boxes, that in the middle boxes, and that in the lowest boxes show the sub-lattice magnetization of the transition metal of the GdFeCo readout layer 63, the GdFeCoAl intermediate layer 64, and the DyFeCo recording layer 65 respectively. The arrows drawn with a wave line show the direction of the external magnetic field. Namely, the external magnetic field is applied, directing upward perpendicular to the film when the external magnetic field is positive, while directing downward perpendicular to the film when the external magnetic field is negative. The white arrows show the direction of the sub-lattice magnetization of the transition metal according to this direction of the external magnetic field.

Apparent due to the FIG. 17(a), the magnetization of the GdFeCo readout layer 63 directs upward according to the external magnetic field when the external magnetic field having a value not smaller than H1(200 (Oe)) shown in the figure is applied perpendicularly upward at room temperature. Note that since the sub-lattice magnetization of the rare-earth metal is more predominant than that of the transition metal in this GdFeCo readout layer 63 in room temperature, the white arrow showing the direction of the sub-lattice magnetization of the transition metal directs downward reverse to the direction of the external magnetic field.

On the other hand, the sub-lattice magnetization of the transition metal in the GdFeCo readout layer 63 directs upward according to the exchange-coupling force between the GdFeCo readout layer 63 and the DyFeCo recording layer 65 when the external magnetic field is not larger than H2. Note that it is because the DyFeCo recording layer 65 has a compenstion temperature at room temperature and therefore its magnetization does not turn over in the range −1000≦H≦+1000 (Oe) that the sub-lattice magnetization of the transition metal of the recording layer 65 directs to a constant direction(upward in the figure) under all values of the external magnetic field.

Apparent due to the FIG. 17(b), the sub-lattice magnetization of the transition metal of the GdFeCo readout layer 63 directs downward according to the external magnetic field when the external magnetic field having a value not smaller than H3 shown in the figure is applied perpendicularly upward at room temperature, and directs upward according to the exchange-coupling force between the GdFeCo readout layer 63 and the DyFeCo recording layer 65 when the external magnetic field is not larger than H4 (800 (Oe)). Additionally similarly to the above-described, the sub-lattice magnetization of the transition metal of the DyFeCo recording layer 65 directs to a constant direction, that is, upward in the figure, under all values of the external magnetic field, and this reflects that the magnetization does not turn over in the range −1000≦H≦+1000 (Oe).

Thus, the magnetic triple layer having the above-described structure causes the relationship $$H1<H4 \tag{12}$$

when H1 stands for the smallest external magnetic field necessary to arrange the magnetization of the GdFeCo readout layer 63 in the direction reverse to the direction accordint to the exchange-coupling force from the DyFeCo recording layer 65 at a low temperature near room temperature and when H4 stands for the largest external magnetic field to arrange the magnetization of the GdFeCo readout layer 63 in the direction same as the direction according to the exchange-coupling force from the DyFeCo recording layer 65 aginst the direction of the external magnetic field at the predetermined high temperature (100° C.).

In order to cause this relationship, the magneto-optical disk of the present embodiment is so arranged that the following inequalities are satisfied among the readout layer 23(the GdFeCo readout layer 63), the intermediate layer 24(the GdFeCoAl intermediate layer 64), and the recording layer 25(the DyFeCo recording layer 65).

Namely, when h1' indicates a thickness of a double-layer film consisting of the readout layer 23 and the intermediate layer 24, Hc1'(ta) a coercive force of the double-layer film at room temperature (ta), Ms1'(ta) a saturation magnetization of the double-layer film at room temperature, σw'(ta) a magnetic domain wall energy between the readout layer 23 and the recording layer 25 at room temperature, Hc1'(t) a coercive force of the double-layer film at the established temperature (t), for example 100° C. Ms1'(t) a saturated magnetization of double-layer film at the established temperature (t), σw'(t) a magnetic domain wall energy between the readout layer 23 and the recording layer 25 at the established temperature (t), Hw1'(ta) an effective bias magnetic field for the readout layer 23 from the recording layer 25 at room temperature, Hw1'(t) an effective bias magnetic field for the readout layer 23 from the recording layer 25 at the established temperature (t), and the following equations are satisfied:

$$Hw1'(ta)=\sigma w'(ta)/2Ms1'(ta)h1'$$

and $$Hw1'(t)=\sigma w'(t)/2Ms1'(t)h1',$$

then, the following equations are satisfied:

$$H1=Hc1'(ta)+Hw1'(ta)$$

and $$H4=-Hc1'(t)+Hw1'(t).$$

Therefore, the above-described inequality (12) is rewritten as follows:

$$Hc1'(ta)+Hw1'(ta)<-Hc1'(t)+Hw1'(t) \tag{13}$$

Accordingly, the magnetic triple layer in the present embodiment is so arranged as to satisfy this inequality (13).

During reproducing in the magneto-optical disk comprising the magnetic triple layer having the above-described property, the reproducing magnetic field Hr which is an external magnetic field satisfying the condition $$H1<Hr<H4 \tag{14}$$

with irradiating the reproducing light beam. Therefore, according to the change of the temperature state of the area which is irradiated with the reproducing light beam, the information in the recording layer 25 can be reproduced from an area smaller than the spot diameter of the light beam with keeping the value of the reproducing magnetic field Hr.

The following description explains the performance during reproducing, referred to FIG. 18.

During reproducing, as shown in FIG. 18, the reproducing light beam 71 is irradiated from the side of the substrate 21 through the objective lens 72 to the readout layer 23. The temperature rises highest in the area close to the center of the area irradiated with the reproducing light beam 71 and the temperature is higher than the surrounding area. This is because the reproducing light beam 71 is focused to the diffraction limit by the objective lens 72 and the light intensity shows the Gaussian distribution and so the temperature of the irradiated area on the magneto-optical disk also shows the Gaussian distribution. Then, the intensity of the reproducing light beam 71 is so set that the temperature is over the above-described established temperature (t) only at the area close to the center in the irradiated area and that the temperature at the surrounding area keep substantially room temperature.

In addition, the reproducing magnetic field Hr having a value between the above-described H1(200 (Oe)) and H4 (800 (Oe)), 300 (Oe) for example, is applied in upward perpendicularly in the figure with using a magnet 73. The sub-lattice magnetizations of the transition metal of the readout layer 23, the intermediate layer 24, and the recording layer 25 at this time are shown by the arrows in the respective layers.

Since the readout layer 23 has a property shown in FIG. 17(b) as above-described at the area higher than the established temperature (t) close to the center in the area irradiated with the reproducing light beam 71, the sub-lattice magnetization of the transition metal of the readout layer 23 directs in the direction obeying the exchange-coupling force from the recording layer 25 without depending on the direction of the reproducing magnetic field Hr, so the information written in the recording layer 25 is transcribed to the readout layer 23 at this part. On the other hand, the readout layer 23 has a property shown in FIG. 17(a) as above-described at the surrounding area lower than the established temperature (t), the sub-lattice magnetization of the transition metal of the readout layer 23 directs constantly in the perpendicular direction, that is downward in the figure, same by the reproducing magnetic field Hr applied upward to the readout layer 23, so the readout layer 23 becomes a state masking the information written in the recording layer 25.

As a result a recording bit recorded in the recording layer 25 is reproduced only from the area close to the center smaller than the diameter of this reproducing light beam in the area irradiated with the reproducing light beam 71.

When the next recording bit is reproduced after the magneto-optical disk is rotated and the reproducing light beam 71 moves, the temperature falls near to room temperature at the previously reproduced area. Accordingly, the sub-lattice magnetization of the transition metal of the readout layer 23 does not obey the sub-lattice magnetization of the transition metal of the recording layer 25 no longer but obey the reproducing magnetic field Hr, thereby masking the previously reproduced area.

In this way since the recording bit is reproduced only from the area close to the center smaller than the diameter of this reproducing light beam and the surrounding area is masked, the recording density in the beam running direction can be improved, and moreover, there is no invasion of signals from the adjacent bits which causes noises, so improved reproduced signal property without crosstalk can be obtained.

Note that the reproducing magnetic field Hr applied during reproducing needs to be such a value not to destroy the information in the recording layer 25. Here, when h2 indicates a thickness of the readout layer, Hc2(ta) a coercive force of the readout layer 25 at room temperature (ta), Ms2(ta) a saturation magnetization of the readout layer 23 at room temperature, Hc2(t) a coercive force of the recording layer 25 at the established temperature (t), Ms2(t) a saturation magnetization of the recording layer 25 at the established temperature (t), Hw2(ta) an effective bias magnetic field for the recording layer 25 from the readout layer 23 at room temperature, Hw2(t) an effective bias magnetic field for the recording layer 25 from the readout layer 23 at the established temperature, and the following equations are satisfied:

$$Hw2(ta)=\sigma w'(ta)/2Ms2(ta)h2$$

and $$Hw2(t)=\sigma w'(t)/2Ms2(t)h2,$$

both the smallest external magnetic field Hinv (ta) which makes the magnetization of the recording layer 25 turn over near at room temperature and the smallest external magnetic field Hinv (t) which makes the magnetization of the recording layer 25 turn over at the established temperature (t) satisfies the following equations:

$$Hinv(ta)=Hc2(ta)-Hw2(ta)$$

and $$Hinv(t)=Hc2(t)-Hw2(t).$$

Therefore, the reproducing magnetic field Hr needs to be set to a value smaller than Hinv (ta) and Hinv (t). Arranging these conditions, the reproducing magnetic field Hr needs to satisfy the inequality (15) led from the inequality (14):

$$Hc1'(ta)+Hw1'(ta)<Hr<-Hc1'(t)+Hw1'(t) \quad (15)$$

and $$Hr<Hc2(ta)-Hw2(ta) \quad (16)$$

and $$Hr<Hc2(t)-Hw2(t) \quad (17)$$

Figure 23A:
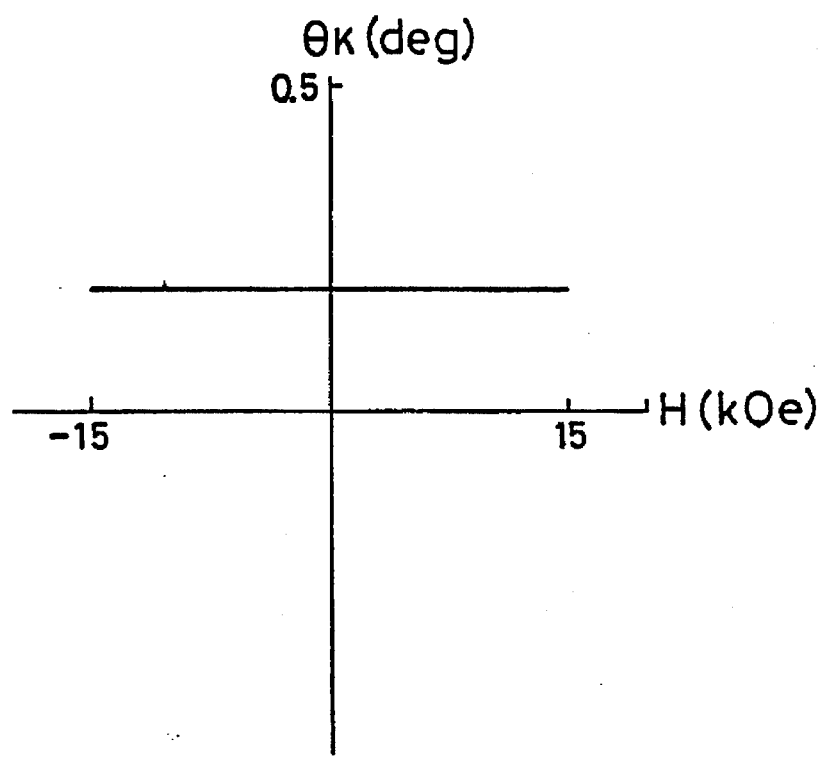
FIG. 23(a) is a graph showing a result of measurement of a Kerr hysteresis loop at room temperature seen from a side of the recording layer in the above-described magnetic triple layer.
Figure 23B:
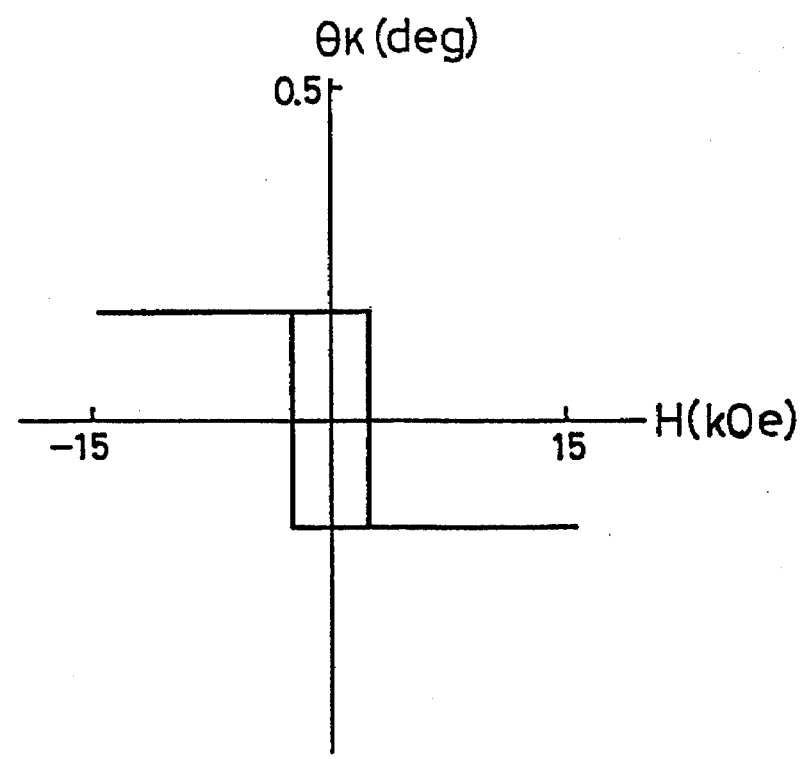
FIG. 23(b) is a similar graph at 100° C.

FIGS. 17(a) and FIG. 17(b) show the folloing results $$Hc1'(ta)+Hw1'(ta)=H1=200(Oe)$$

and $$-Hc1'(100°C.)+Hw1'(100°C.)=H4=800(Oe)$$

in the magnetic triple layer used in this embodiment. On the other hand, FIGS. 23(a) and FIG. 23(b) show the Kerr hysteresis loops of the DyFeCo recording layer 65 measured with irradiating a light beam from the side reverse to the side where the glass substrate 61 was provided for the sample shown in FIG. 22 which gives the measurement result shown in FIGS. 17(a) and FIG. 17(b). These are the measurement result when the magnetic field is changed in the range $-15<H<15$ (kOe) with the light beam having a wave length of 633 nm at room temperature (FIG. 23(a)) and at 100° C.(FIG. 23(b)), respectively.

These figures show the following inequalities:

$$Hc2(ta)-Hw2(ta)>15(kOe)$$

and $$Hc2(100°C.)-Hw2(100°C.)=2.5(kOe).$$

Then, it is proved that setting the reproducing magnetic field Hr to 300 (Oe) in the range 200<Hr<800 (Oe) satisfies the inequalities (16) and (17) as well as the inequality (15).

In this way, by the arrangement of the above-described magnetic triple layer and the reproducing magnetic field Hr as above-described set, the sub-lattice magnetization of the transition metal of the readout layer 23 obeys the direction of the reproducing magnetic field Hr at room temperature and obeys the exchange-coupling force from the recording layer 25 under the same reproducing magnetic field Hr at 100° C. Therefore, it is made possible to reproduce a recording bit smaller than the diameter of the reproducing light beam 71, and moreover, since there is no influence due to the adjacent recording bits, it is possible to improve the recording density in the direction perpendicular to the track as in the recording light beam running direction. Futhermore, the magneto-optical recording apparatus can be made small and electric power consumption can be decreased because a magnetic field for initializing, which the above-described RAD method needs, is not necessary.

By the way, even if the magneto-optical disk is arranged with a magnetic double layer comprising not the intermediate layer 24 but both the readout layer 23 and the recording layer 25 instead of with the above-described magnetic triple layer, it is possible to some degree to make the apparatus small and decrease electric power consumption similar to the present embodiment if the magnetic property between these two layers and the reproducing magnetic field satisfy the equal conditions to the above-described inequalities (12) to (17). Then, the following description explains the reason the intermediate layer 24 is provided in the present embodiment.

First, a comparative sample was made which is different only at a point where the GdFeCoAl intermediate layer 64 is not provided, corresponding to the sample shown in FIG. 22. Namely, as shown in FIG. 30(c), this sample has a structure laminated with an AlN dielectric layer 61' with thickness of 70 nm, a GdFeCo readout layer 63' with thickness of 50 nm, a DyFeCo recording layer 65' with thickness of 50 nm, and an AlN dielectric layer 66' with thickness of 30 nm on a glass substrate 61' in this order.

The composition of the GdFeCo readout layer 63' is $Gd_{0.22}(Fe_{0.82}Co_{0.18})_{0.78}$, and the sub-lattice magnetization of the rare-earth metal is more predominant than that of the transition metal at room temperature. Its compensation temperature is 170° C. and its Curie temperature is about 330° C. The composition of the DyFeCo readout layer 65' is $Dy_{0.25}(Fe_{0.84}Co_{0.16})_{0.75}$. Its compensation temperature is room temperature and its Curie temperature is 200° C. These compositions and the thickness are the same as that of the readout layer 23 and the recording layer 25 in the present embodiment.

Figure 30A:
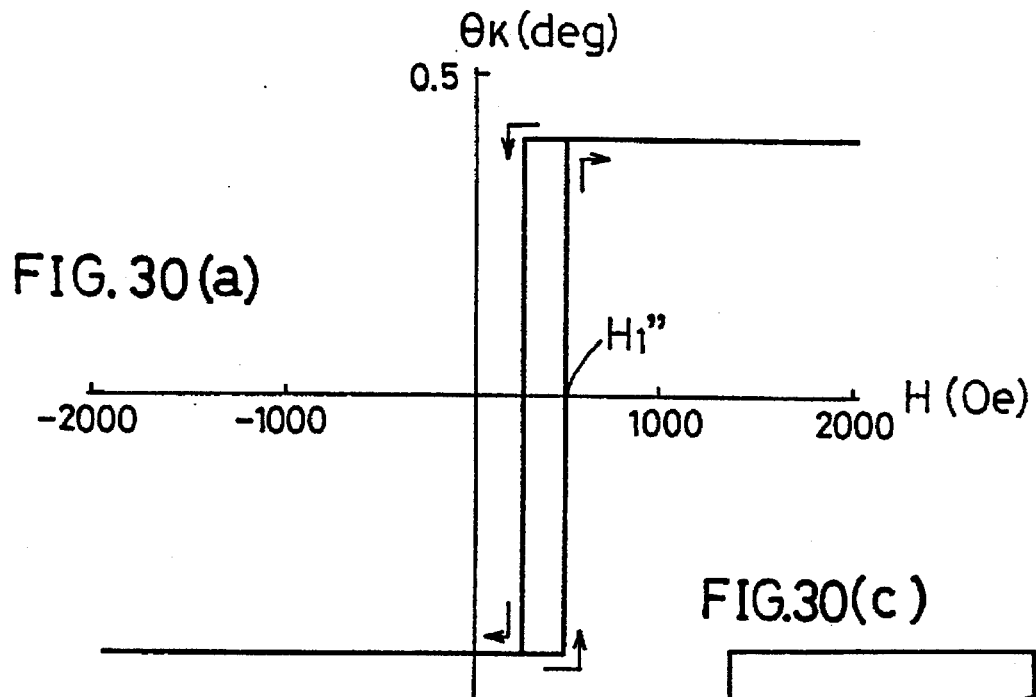
FIG. 30(a) is a graph showing a result of measurement of a Kerr hysteresis loop at room temperature seen from a side of a readout layer in a magneto-optical disk having a magnetic double layer for comparison.
Figure 30C:
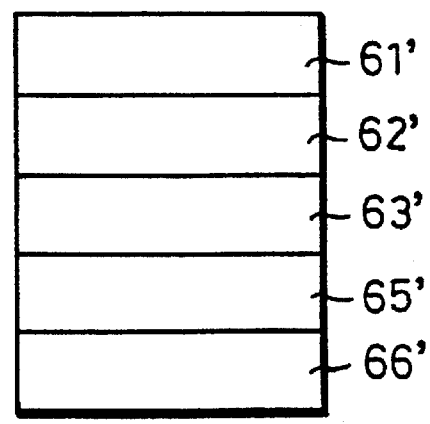
FIG. 30(c) is an explanatory figure showing a structure of a comparatory sample made for mesureing the above-described properties.
Figure 30B:
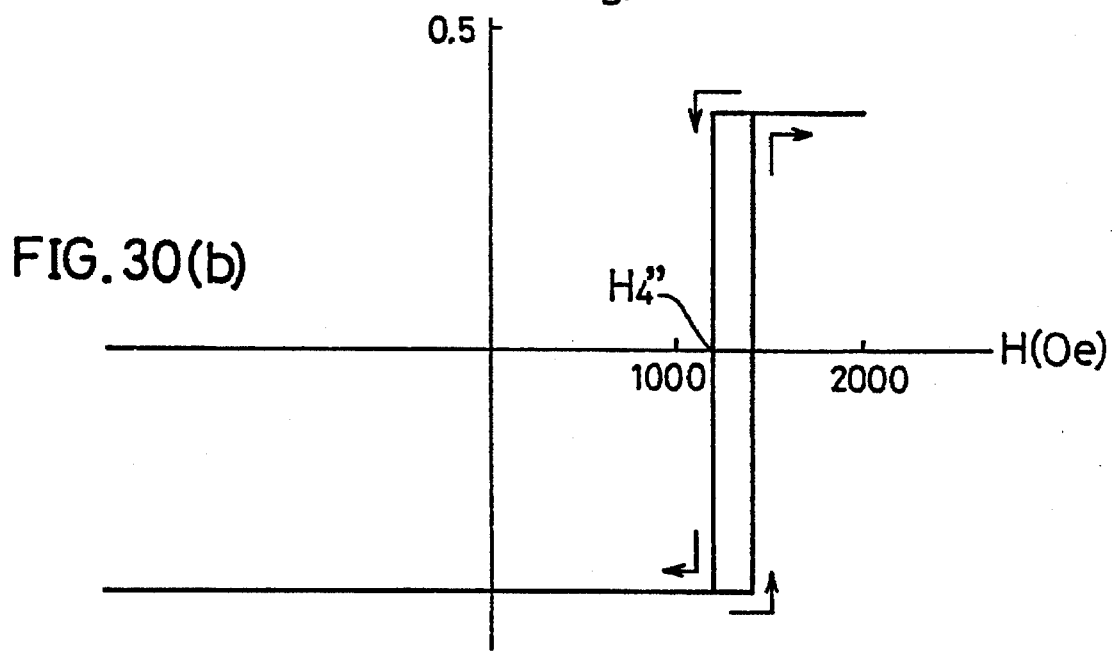
FIG. 30(b) is a similar graph at 100° C.
Figure 31:
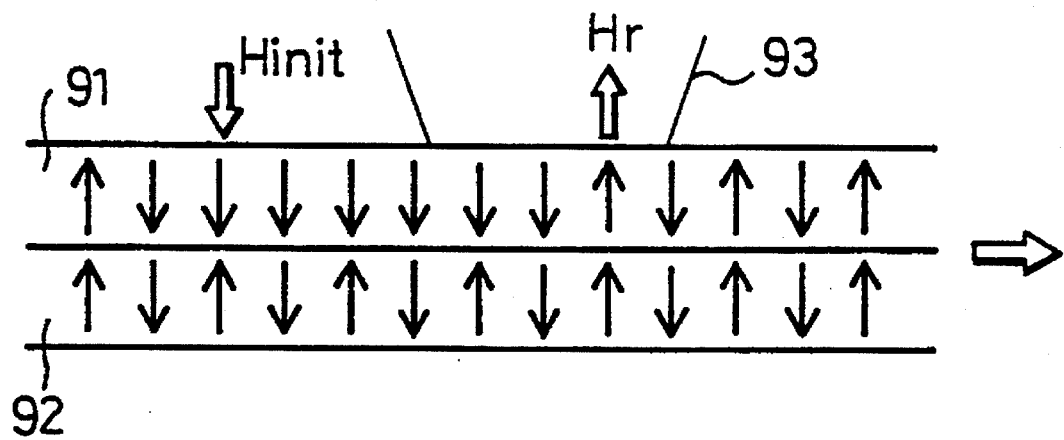
FIG. 31 is an explanatory figure showing a motion at reproducing in a RAP type magneto-optical disk.
Figure 32:
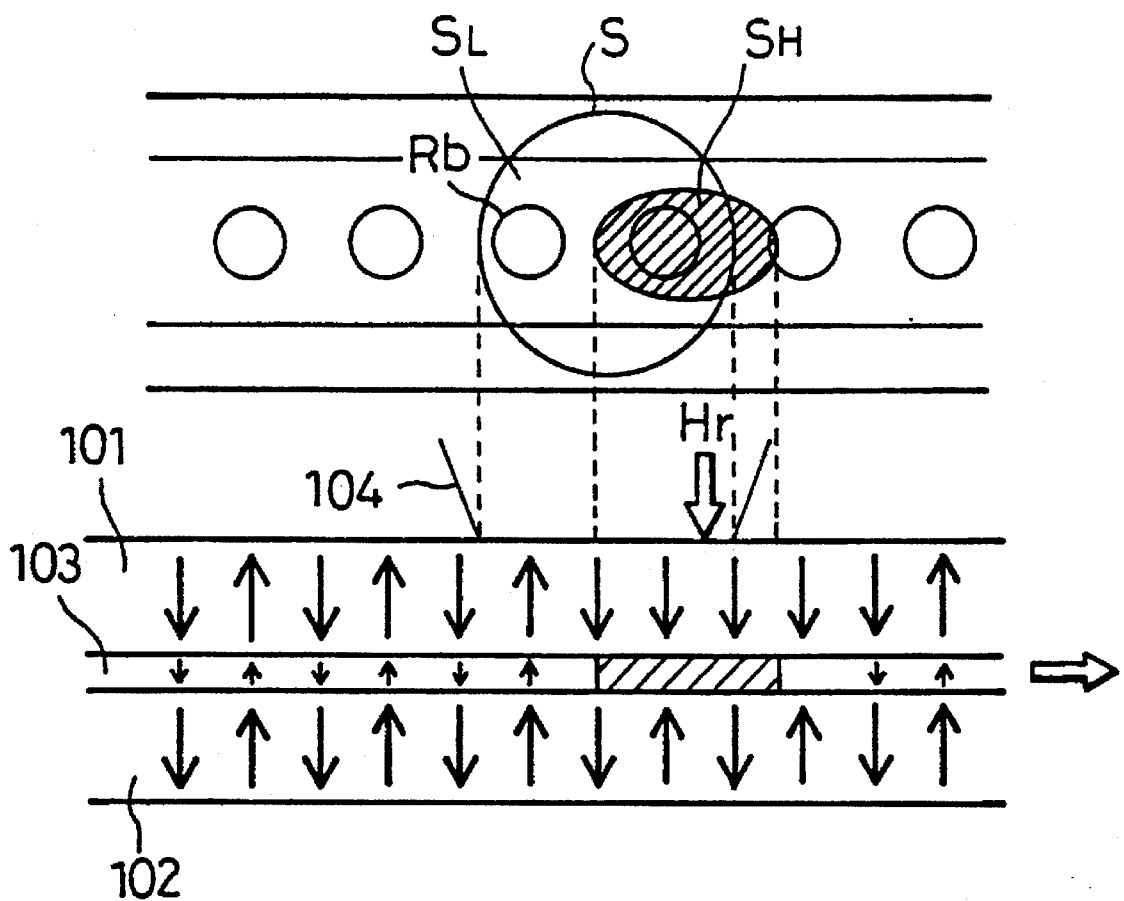
FIG. 32 is an explanatory figure showing a motion at reproducing in a FAD type magneto-optical disk.

FIG. 30(a) and FIG.30(b) show the Kerr hysteresis loops measured for the above-described comparative sample from the side of the glass substrate 61' at room temperature and at 100° C., with canceling the Kerr lotation of the glass substrate 61'. The measurement was made by irradiating the light beam having a wave length of 633 nm, and the external magnetic field is made to change from −2000 to +2000 (Oe). FIG. 30(a) and FIG. 30(b) show the result at room temperature and at 100° C. respectively, and these figures correspond to the FIG. 17(a) and FIG. 17(b) showing the measurement about the magnetic triple layer, respectively.

FIG. 30(a) tells that the magnetic field H1" corresponding to H1 shown in FIG. 17(a) is 450 (Oe). FIG. 30(b) tells that the magnetic field H4" corresponding to H4 shown in FIG. 17(b) is 1200 (Oe). Accordingly, it is proved that the magnetic field Hr to be applied during reproducing needs to be in the range 450<Hr<1200 (Oe). In short, a large magnetic field is necessary during reproducing in this case.

On the contrary, it is proved that the intermediate layer 24, which shows the in-plane magnetization at room temperature in this embodiment, acts so as to inhibit the effective bias magnetic field from the recording layer 25 to the readout layer 23, specially at room temperature. Therefore, since the readout layer 23 is made easy to turn over according to the external magnetic field at arranging the magnetization direction of the readout layer 23 uniformly at room temperature, H1 is smaller than H1'.

Therefore, since it is possible to make a device generating the reproducing magnetic field Hr smaller compared to the value with the magnetic double layer, it is possible to make the recording-reproducing apparatus smaller and to decrease electric power consumption more remarkablly.

The following description explains about the measurement result of the reproducing property in the magneto-optical disk having the above-described magnetic triple layer, showing a concrete data example.

The semiconductor laser of the optical pickup used in the experiment has a wave length of 780 nm and the numerical aperture(N.A.) of the objective lens is 0.55, similarly to the first embodiment. First, a single frequency recording bit with length of 0.765 μm was recorded beforehand on the land which was located at 26.5 mm from the center of the above-described magneto-optical disk under the rotation speed of 1800 rpm(a linear speed of 5 m/sec). The recording was so made as follows: First, the magnetization direction of the recording layer 25 was arranged in one direction, that is, was initialized, and then, fixing the direction of the external magnetic field for recording in the direction reverse to the initializing direction, recording was made with modulating the laser with a recording frequency which corresponds to the length of 0.765 μm(that is, about 3.3 MHz in this case). The recording laser power was about 7 mW.

Figure 24:
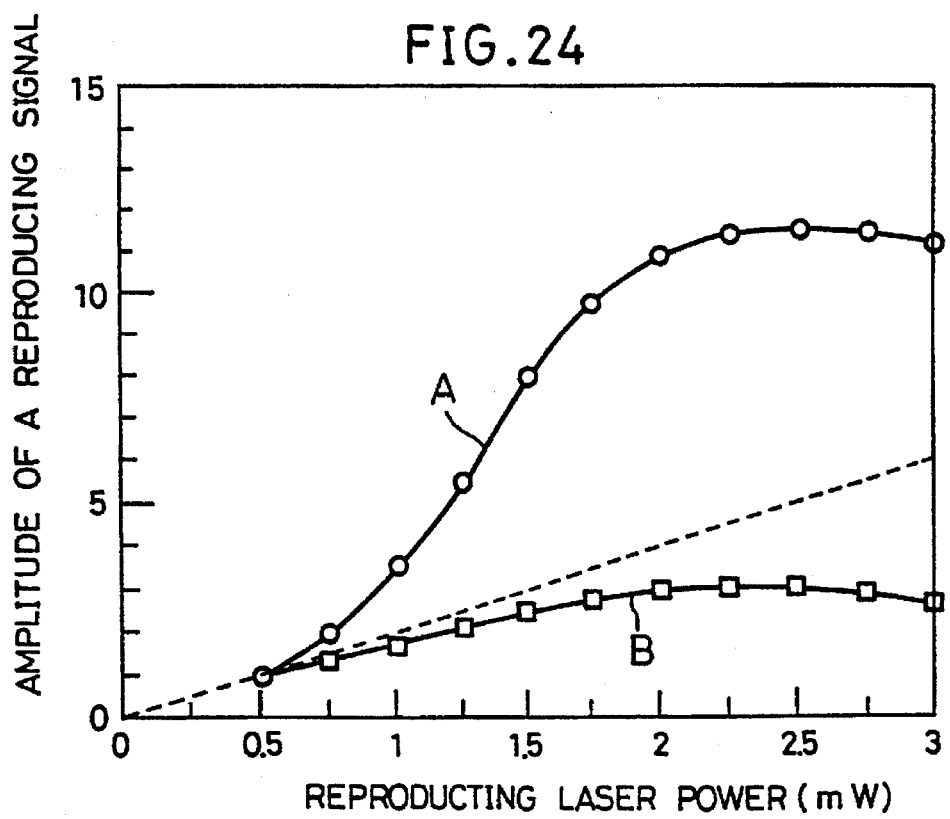
FIG. 24 is a graph showing a relationship between a reproducing power and an amplitude of a reproducing signal in the above-described magneto-optical disk.

The recording bit was reproduced while changing a reproducing laser power and an external magnetic field to be applied during reproducing and the amplitude of the reproduced signal was reserched. FIG. 24 shows the result.

In the figure the horizontal axis stands for the reproducing laser power, and the measurement was made in the range from 0.5 mW to 3.0 mW. The perpendicular axis stands for the amplitude of the reproduced signal, and the result is normalized with using the amplitude value obtained with the reproducing laser power of 0.5 mW. The curve named "A" shows the measured result in the magneto-optical disk in the present embodiment and the external magnetic field to be applied during reproducing was 300 (Oe). The curve named "B" shows the measured result in the conventional magneto-optical disk made for comparison.

The conventional magneto-optical disk, which is similar to that used in the first embodiment, was provided with an AlN layer with thickness of 80 nm, a DyFeCo layer with thickness of 20 nm, an AlN layer with thickness of 25 nm, and an AlNi layer with thickness of 30 nm on a glass substrate in this order, and there is provided an overcoat layer same as above-described on the AlNi layer. Namely, this magneto-optical disk has such a structure: there is one DyFeCo layer consisting of a rare earth-transition metal alloy, which layer lies between the AlN layers that act as a transparent dielectric layer and a protective layer, and then the AlNi layer which is a reflective layer is provided at last. This DyFeCo layer shows a perpendicular magnetization from room temperature to a high temperature. Hereinafter, this disk is called the comparative single disk. No external magnetic field is applied during reproducing for this comparative single disk.

The broken line drawn in the figure is a line that connects both the origin and the standard value of the amplitude at 0.5 mW and shows a proportional linear line standing for the relationship between both the signal amplitude during reproducing the magneto-optical signal and the reproducing laser power as shown in the first embodiment. The medium reflecting light amount is increased in proportion to the reproducing laser power and therefore can be replaced by the reproducing laser power.

In the figure, the measurement result curve B of the conventional magneto-optical disk is below the above-described proportional linear line. Since the reason for this is the same as described in the first embodiment, it is omitted here.

Similarly to the first embodiment, the measurement result curve A of the magneto-optical disk in this embodiment shows that the signal amplitude is abruptly increased according to increasement of the reproducing laser power so as to get above the above-described proportional linear line, and shows the fact that the amplitude is increased more than the amount corresponding to the increased amount of the reproducing laser power. This result reflects, similarly to the first embodiment, the later-described property of the magnetic multi-layer structure having the above-described readout layer 23 and the recording layer 25, which is a triple layer structure here. So this result supports the performance of the structure.

Namely, the above-described property means that the information recorded in the recording layer 25 is so masked due to the effect from both the external magnetic field Hr and the readout layer 23, as not to be reproduced, and that the information is reproduced because the sub-lattice magnetization of the transition metal of the readout layer 23 accords to the sub-lattice magnetization of the transition metal of the recording layer 25, as the temperature rises.

The next description explains the result of reseaching the quality of the reproduced signal similarly to the first embodiment in case where the recording bit is smaller. Here, it means improvement of the recording density to make possible to reproduce a smaller recording bit.

Figure 25:
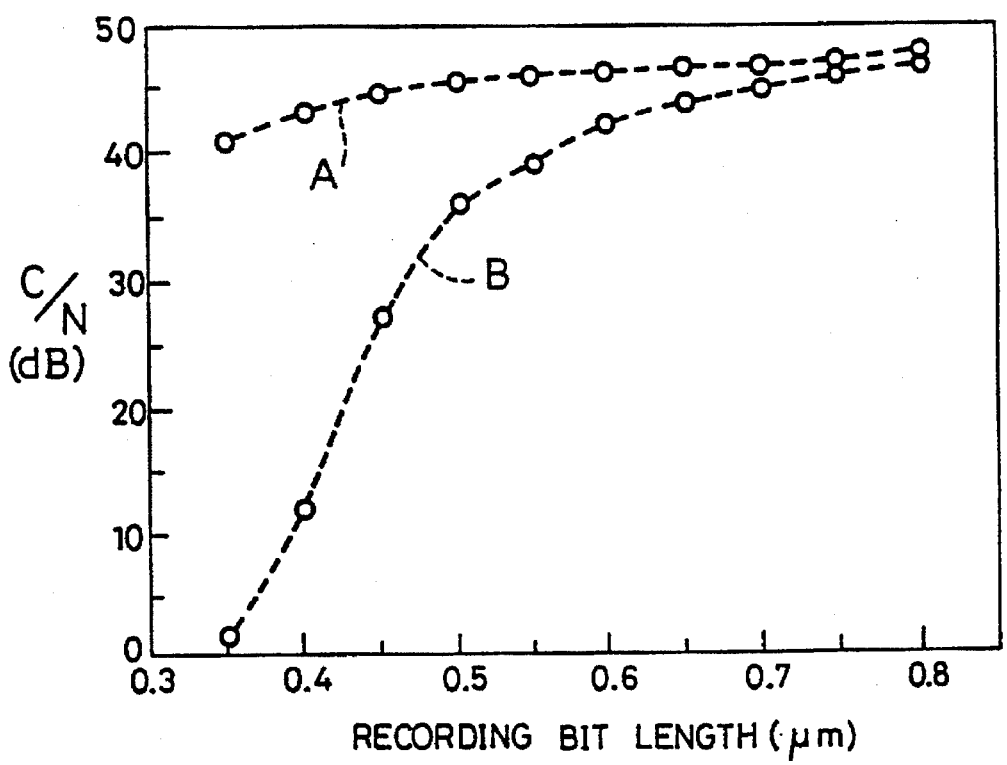
FIG. 25 is a graph showing a relationship between an quality of a reproducing signal(C/N) for a length of a recording bit in the above-described magneto-optical disk.

FIG. 25 shows the relationship between the length of the recording bit and the quality of the reproduced signal(C/N). In this experiment, the linear speed of the disk was set to 5 m/sec like the previous experiment, but the recording frequency at recording was changed from the previous experiment. Then the C/N was measured. The optical pickup and recording method other than the above-described are all the same as those of the previous experiment (FIG. 24). In the figure, the curve named "A" shows the measurement result for the magneto-optical disk of the present embodiment, and the reproducing laser power was set to 2.5 mW and the external magnetic field Hr to be applied during reproducing was set to 300 (Oe). Meanwhile, the curve named "B" shows the measurement result for the comparative single disk same as that used in the previous experiment, and the reproducing laser power was set to 1 mW and no external magnetic field was applied during reproducing.

There is little difference between the both disks in a long bit which has a recording bit length of longer than 0.7 μm, but there is a remarkable difference between both the measurement result curve A for the magneto-optical disk of the present embodiment and the measurement result curve B for the comparative single disk in a recording bit length of not longer than 0.7 µm.

C/N is low in a recording bit length of not longer than 0.7 µm in the comparative single disk. The reason for that is, as described in the first embodiment, as follows: The number (area) of the bit existing inside of the area irradiated with the light beam is so increased as the bit length is decreased that the individual bits become not to be distinguish each other.

Using the wave length (780 nm) of the laser of the optical pickup and the numerical aperture(0.55) of the objective lens used in this experiment, the cutoff space frequency described in the first embodiment is calculated. Converting it for the recording bit length, the value 0.355 µm was obtained similarly to the first embodiment. The limit of the optical resolution of the optical pickup used in this experiment is a bit length of 0.355 µm. Reflecting this calculated result, C/N at 0.355 µm is substantially 0 in the comparative single disk.

Meanwhile, in the magneto-optical disk of this embodiment, though C/N is a little decreased as the bit length becomes small, C/N keeps a large value even at a bit shorter than 0.355 µm which is the optical resolution limit.

The above-described result confirms that a bit smaller than the optical diffraction limit can be reproduced with using the magneto-optical disk of this embodiment. Therefore, it is possible to improve the recording density remarkablly compared with the conventional magneto-optical disk.

Next description explains the experiment result, similarly to the first embodiment, about decreasement of the amount of crosstalk, which is another important effect, in additioin to the above-described recording density improving effect. Here, matters described in the first embodiment are omitted.

The magneto-optical disk provided with the above-described glass substrate having a land width of 0.8 µm and a groove width of 0.8 µm is used in this experiment, so the amount of crosstalk from the both adjacent grooves during reproducing the information in the land was measured.

Figure 26:
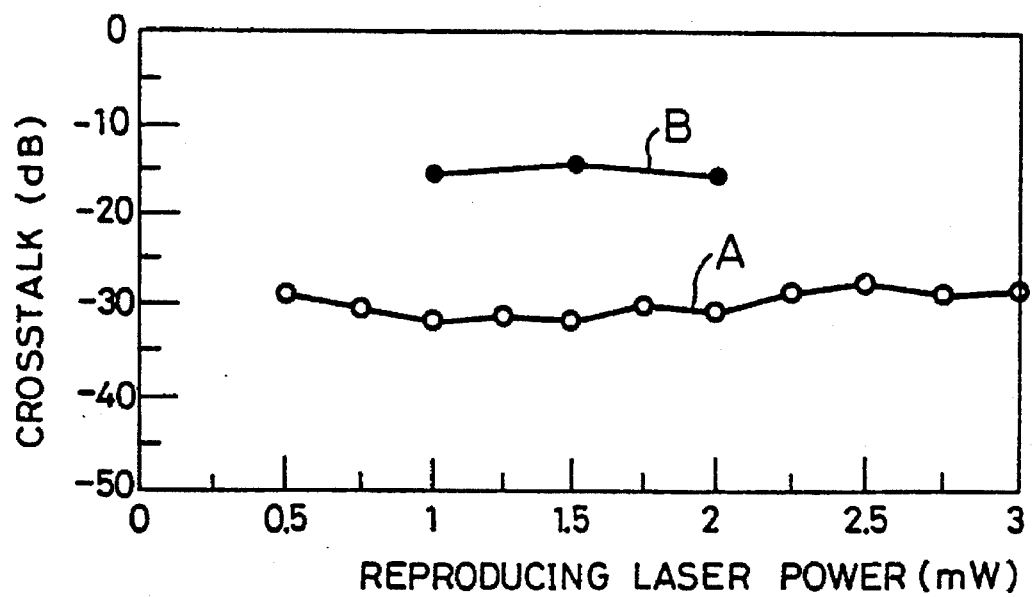
FIG. 26 is a graph showing a crosstalk amount in the above-described magneto-optical disk.

FIG. 26 shows the measurement result in this experiment for the magneto-optical disk of this embodiment and the comparative single disk. In this graph, the horizontal axis stands for the reproducing laser power and the perpendicular axis stands for the amount of the crosstalk. In the figure, the curve named "A" shows the measurement result for the magneto-optical disk of the present embodiment, and the external magnetic field Hr to be applied during reproducing was set to 300 (Oe). Meanwhile, the curve named "B" shows the measurement result for the comparative single disk.

This graph makes clear the result that the amount of crosstalk is large as about −15 dB in the comparative single disk(B), while the amount of crosstalk is −30 dB in the magneto-optical disk(A) of this embodiment, passing the value −26 dB which is predetermined in the above-described ISO standard.

Figure 27:
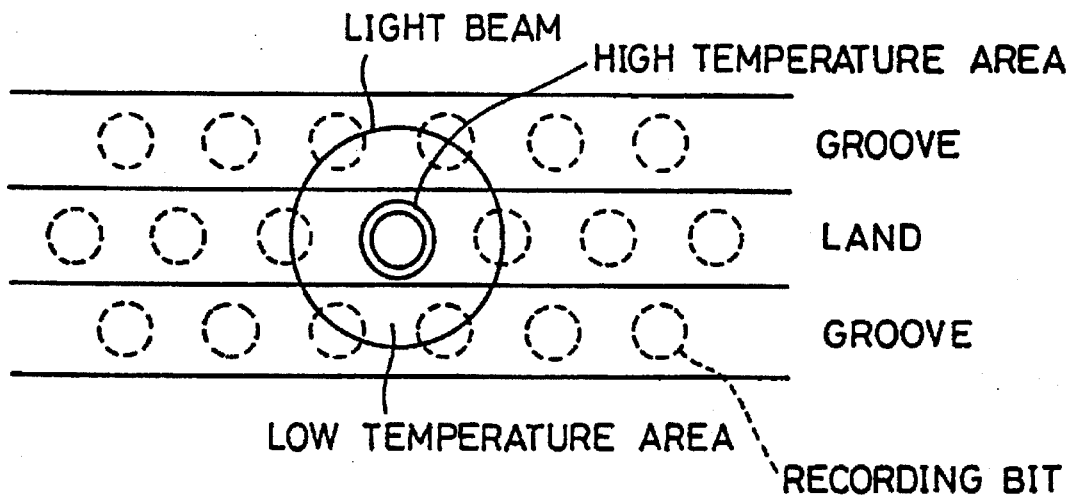
FIG. 27 is an explanatory plane figure showing a temperature distribution when a reproducing light beam is irradiated in the above-described magneto-optical disk.

Since the reason for that such a result is obtained is the same as that described in the first embodiment, the detail is omitted here, but the point about the magneto-optical disk in the present embodiment is as follows: Namely, in the magneto-optical disk of this embodiment, the sub-lattice magnetization of the transition metal of the readout layer 23 acts according to the direction(that is, the recorded information) of the sub-lattice magnetization of the transition metal of the recording layer 25 only at the area close to the center of the light beam. Meanwhile, the sub-lattice magnetization of the transition metal of the readout layer 23 directs according to the external magnetic field applied during reproducing at the area other than the center of the light beam. Therefore, as shown in FIG. 27, since only one bit located at the center of the light beam is concerned to reproducing even though there are seven bits in the light beam as above-described, a large C/N is obtained even though the bit is very small like 0.355 µm. Moreover, there is very small crosstalk from the adjacent track.

In this way, the recording density can be much improved and it is possible to obtain the reproducing property with decreased crosstalk compared with the conventional magneto-optical disk by using the magneto-optical disk having a magnetic triple layer laminated the readout layer 23, the intermediate layer 24, and the recording layer 25 and irradiating the laser beam while applying the external magnetic field(reproducing magnetic field Hr).

As above-explained, changing the temperature under the condition applying the reproducing magnetic field Hr which is a predetermined external magnetic field, the magneto-optical disk of the present embodiment acts as follows: the magnetization direction of the readout layer 23 directs in the same direction as the magnetization direction of the recording layer 25 independently to the direction of the reproducing magnetic field Hr at the area where the temperature is higher than the established temperature, while the magnetization direction of the readout layer 23 directs in the same direction as the magnetization direction of the reproducing magnetic field Hr independently to the direction of the recording layer 25 at the area where the temperature is lower than the established temperature.

Therefore, by changing the intensity of the light beam irradiated during reproducing and the value of the reproducing magnetic field Hr properly, it is made possible to reproduce the information recorded in the recording layer 25 only at the area close to the center of the irradiated area, masking the surrounding area. Accordingly, since it is made possible to concern only the area, smaller than the diameter of the light beam, close to the center to reproducing, the reproducing resolution is improved. Futhermore, the information in the recording layer 25 is not influenced by the above-described reproducing magnetic field Hr. Therefore, even if the track pitch is made narrow, crosstalk is not increased, and moreover it is made possible to improve the recording density in the track running direction. Furthermore, these effects are realized without an initializing magnetic field.

In addition, in the present embodiment, since the intermediate layer 24 consists of, for example, the magnetic layer whose magnetization direction changes from the in-plane direction to the perpendicular direction according to rising of the temperature from room temperature as a single layer, is made possible to decrease the magnetic field necessary arrange the magnetization direction of to the readout layer 23 whose temperature is lower than the established temperature to the direction of the reproducing magnetic field Hr. Therefore, the apparatus can be made smaller and the electric power consumption can be more decreased.

The following description will discuss a fourth embodiment of the present invention. For the sake of convenience, members having the same function as in the above-described embodiment will be designated by the same code and their description will be omitted.

While the third embodiment shows the case where the GdFeCoAl alloy whose magnetization direction changes from the in-plane direction to the perpendicular direction according to increase of the temperature from room temperature as a single layer is used for the intermediate layer 24 of a magnetic triple layer, the present embodiment shows the case where the intermediate layer 24 consists of a material whose magnetization shows the perpendicular magnetization from room temperature to its Curie temperature.

The intermediate layer 24 consists of GdFeCoAl rare earth-transition metal alloy similar to the third embodiment. FIG. 28 shows the temperature dependency of the corecive force(He) as a single layer of this GdFeCoAl alloy layer having thickness of 20 nm. The compensation temperature of the layer is 120° C. and its Curie temperature is 160° C. Some Kerr hysteresis loops at representative temperatures are shown in the figure. Similar to the example shown in FIG. 20(b) in the third embodiment, the material was made with laminating an AlN dielectric layer 42 with a thickness of 70 nm, a GdFeCoAl film with a thickness of 20 nm as a magnetic layer 43, an AlN dielectric layer 44 with a thickness of 50 nm, and an Al reflective layer 45 with thickness of 30 nm on a glass substrate 41, and this datum was obtained by measuring with irradiating a light beam with a wave length of 633 nm to the material from a side of the glass substrate 41.

Since this GdFeCoAl film has a larger perpendicular magnetic anisotropy than that of the film in the third embodiment, its magnetization directs perpendicularly even at room temperature.

In order to measure the whole magnetic property of the magnetic triple layer having the intermediate layer 24 between the readout layer 23 and the recording layer 25, the sample same as that of the third embodiment shown in FIG. 22 was made. Namely, the sample was made with laminating an AlN dielectric film 62 with thickness of 70 nm, a GdFeCo readout layer 63 with thicknes of 50 nm, a GdFeCoAl intermediate layer 64 with thickness of 20 nm, a DyFeCo recording layer 65 with thickness of 50 nm, and an AlN dielectric film 66 with thickness of 30 nm on a glass substrate 61 for this measurement. The GdFeCo readout layer 63 in this sample has the same film thickness and the same composition as those of the readout layer in the third embodiment, respectively. Similarly, the DyFeCo recording layer 65 in this sample has the same film thickness and the same composition as those of the recording layer in the third embodiment, respectively.

Figure 29A:
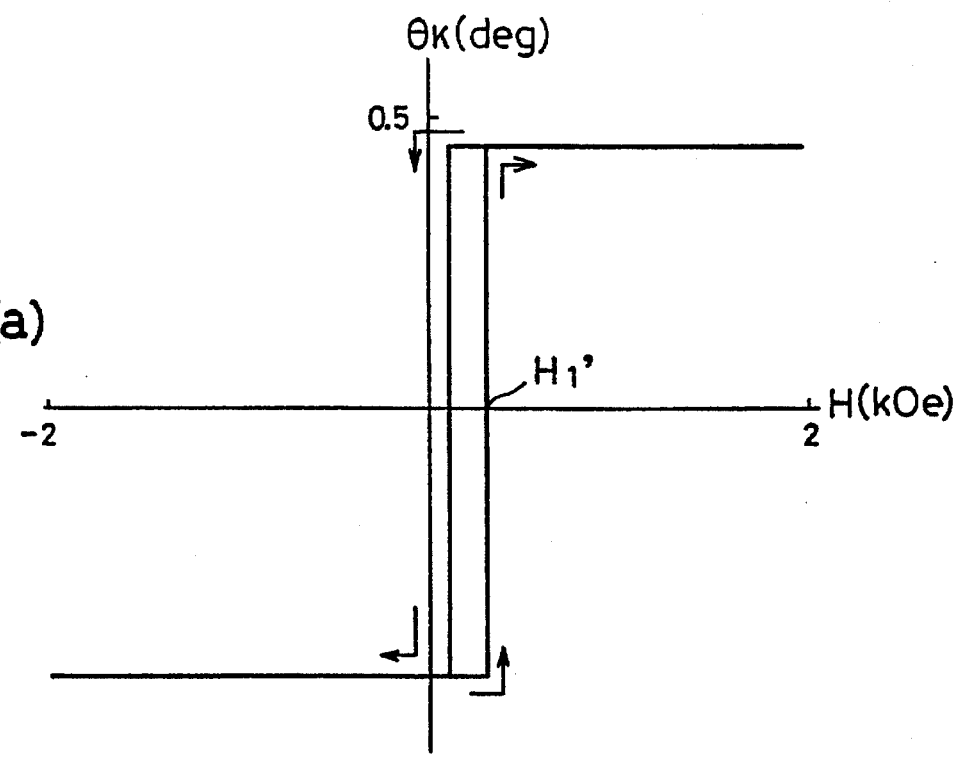
FIG. 29(a) is a graph showing a result of measurement of a Kerr hysteresis loop at room temperature seen from a side of the readout layer in a magnetic triple layer comprising the intermediate layer shown in the FIG. 28.
Figure 29B:
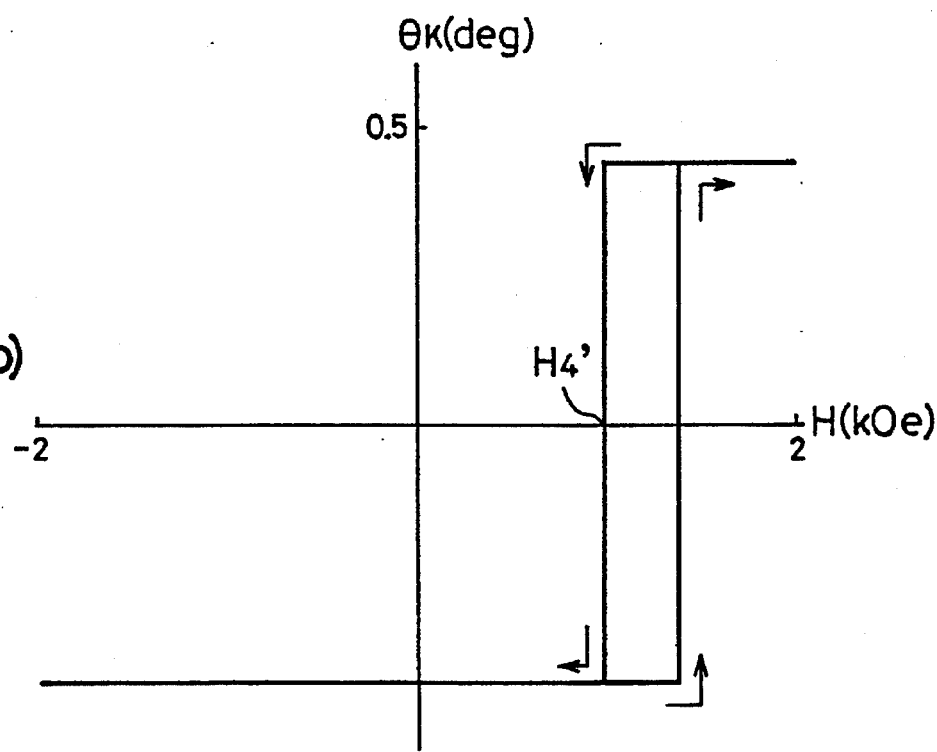
FIG. 29(b) is a similar graph at 100° C.

FIG. 29(a) and FIG. 29(b) show the Kerr hysteresis loops measured from the side of the glass substrate 61 in the above-described sample at room temperature and at 100° C. Each figure is shown with canceling a Kerr rotation due to the glass substrate 61. The measurement was made with irradiating a light beam with a wave length of 633 nm and changing the external magnetic field in the range from −2 (kOe) to +2 (kOe). FIG. 29(a) and FIG.29(b) show the measured result at room temperature and at 100° C. respectively. These results correspond to FIG. 17(a) and FIG. 17(b) in the third embodiment respectively.

These figures show that the magnetic triple layer in the present embodiment has the magnetic field H1' of 300 (Oe) corresponding to H1 in FIG. 17(a) and the magnetic field H4' of 1000 (Oe) corresponding to H4 in FIG. 17(b). Accordingly, it is possible to reproduce the information recorded in the high density similarly to the first embodiment, by applying the magnetic field in the range 300<Hr<1000 (Oe) during reproducing. Moreover, since H1' is 300 (Oe) in the present embodiment while H1" in the above-described magnetic double layer shown in FIG. 30 is 450 (Oe), the reproducing magnetic field Hr can be made smaller.

In this way, the intermediate layer 24 which inhibits the effective bias magnetic field applied from the recording layer 25 to the readout layer 23 can be arranged with a material which shows the perpendicular magnetization at room temperature. However, adopting a material which shows the in-plane magnetization at room temperature like the third embodiment, the above-described inhibiting effect become more ramarkable, so the reproducing magnetic field Hr can be made much smaller.

Note that the third and fourth embodiments, as well as the first and second embodiments, do not limit the present invention. For example, based upon the point of the present invention, it is possible to change variously the composition, the film thickness, the kind of the alloy, and so on of the readout layer 23, the intermediate layer 24, the recording layer 25, and so on to anything where the film thickness, the magnetic property, and the applied magnetic field on the magnetic triple layer satisfy the inequalities (12) to (17) shown in the embodiments.

Namely, since the rare earth-transition metal alloy is a material type where its corecive force, the value of its magnetization, and its magnetic domain wall energy on the interface are much changed by changing the ratio of the rare-earth metal and the transition metal, it is possible to make a structure having different H1 and H4 by changing the ratio in the GdFeCo, GdFeCoAl, and DyFeCo. Moreover, to change the film thickness is the same as above-described.

Furthermore, since the rare earth-transition metal alloy is a material type whose compensation temperature, where the magnetization of the rare-earth metal and that of the transition metal balance with each other, is changed by changing the ratio of the rare-earth metal and the transition metal, it is possible to use, for example, GdDyFeCo, NdGdFeCo, GdCo, and so on instead of GdFeCo used in the readout layer, and, similarly, to use TbFeCo, GdTbFe, GdTbFeCo, GdDyFeCo, NdGdFeCo, and so on instead of DyFeCo used in the recording layer.

Furthermore, Al is added mainly to control the Curie temperature in GdFeCoAl used for the intermediate layer. However, since non-magnetic metals other than Al and, additionally, Ni also have an effect decreasing the Curie temperature when they are added in the rare earth-transition metal alloy, they can be added instead of Al. Moreover, it is possible to use another rare earth-transition metal alloy which has a comparatively low Curie temperature and to use the material prepared by adding the above-described additional elements to the alloy.

Additionally, it is possoble to arrange the magnetic layer as such an apparent magnetic double layer as to satisfy the inequalities (12) to (17) by changing the composition in the direction of the film thickness. Futhremore, in the scope of the present invention, it is also possible to make the structure a multi-layered one with more layers by providing other layers besides the intermediate layer 24, for example, between the readout layer 23 and the recording layer 25.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:
   a recording layer consisting of a magnetic layer having a perpendicular magnetic anisotropy, whereon an information is recorded; and
   a readout layer, which is provided on the recording layer, consisting of a magnetic layer having a perpendicular magnetic anisotropy, whereon the information recorded on the recording layer is reproduced by irradiation of light beam, and the readout layer and the recording layer have a relationship wherein the following condition is satisfied:

$$Hc1(t)+CHw1(t)>0$$

and $$Hc1(ta)+Hw1(ta)<-Hc1(t)+Hw1/t),$$

where h1 indicates a thickness of the readout layer, Hc1(ta) a coercive force of the readout layer at a room temperature (ta), Ms1(ta) a saturation magnetization of the readout layer at room temperature, σw (ta) a magnetic domain wall energy between the readout layer and the recording layer at the room temperature, Hc1(t) a coercive force of the readout layer at the temperature (t), Ms1(t) a saturation magnetization of the readout layer at the temperature (t), σw(t) a magnetic domain wall energy between the readout layer and the recording layer at the temperature (t), Hw1(ta) an effective bias magnetic field applied to the readout layer from the recording layer at the room temperature, Mw1(t) an effective bias magnetic field applied to the readout Layer from the recording layer at the temperature (t), the effective bias magnetic fields Hw1(ta) and Hw1(t) satisfying Hw1(ta) =σw(ta)/2Ms1(ta)h1 and Hw1(t)=σw(t)/2Ms1(t)h1.

2. The magneto-optical recording medium as defined in claim 1, wherein the readout layer has a thickness of not more than 150 nm.

3. The magneto-optical recording medium as defined in claim 1, wherein both the readout layer and the recording layer consist of a rare earth-transition metal alloy which is a ferri magnetic material.

4. The magneto-optical recording medium as defined in claim 1, further comprising an intermediate layer provided between the readout layer and the recording layer, which decreases an effective bias magnetic field applied to the readout layer from the recording layer at the room temperature.

5. The magneto-optical recording medium as defined in claim 3, wherein the readout layer has a sub-lattice magnetization of the rare-earth metal and a sub-lattice magnetization of the transition metal at the room temperature, the sub-lattice magnetization of the rare-earth metal being more predominant than the sub-lattice magnetization of the transition metal at the room temperature.

6. The magneto-optical recording medium as defined in claim 4, wherein the following condition is satisfied: Hc1'(t)=Hw1'(t)<and Hc1'(ta)+Hw1'(ta)<-Hc1'(t)+Hw1'(t), where h1' indicates a thickness of a double-layer consisting of the readout layer and, the intermediate layer, Hc1'(ta) a coercive force of the double-layer at the room temperature (ta), Ms1'(ta) a saturation magnetization of the double-layer at the room temperature, σw'(ta) a magnetic domain wall energy between the readout layer and the recording layer at the room temperature, Hc1'(t) a coercive force of the double-layer at the temperature (t), Ms1'(t) a saturation magnetization of doble-layer film at the temperature (t), σHw'(t) a magnetic domain wall energy between the readout layer and the recording layer at the temperature (t), Hw1'(ta) an effective bias magnetic field applied to the readout layer from the recording layer at the room temperature, Hw1'(t) an effective bias magnetic field applied to the readout layer from the recording layer at the temperature (t), the effective bias magnetic fields Hw1'(ta) and Hw1'(t) satisfying Hw1'(ta)=σw'(ta)/2Ms1'(ta)h1' and Hw1'(t)=σw'(t)/2Ms1'(t)h1'.

7. The magneto-optical recording medium as defined in claim 4, wherein the intermediate layer comprises a single-layered magnetic layer whose magnetization directs from an in-plane direction to a perpendicular direction acccording to rising of a temperature from the room temperature.

8. The magneto-optical recording medium as defined in claim 4, wherein the intermediate layer comprises a single-layered magnetic layer which shows a perpendicular magnetization from the room temperature to the temperature (t).

9. The magneto-optical recording medium as defined in claim 4, wherein all the readout layer, the intermediate layer, and the recording layer consist of a rare earth-transition metal alloy which is a ferri magnetic material respectively.

10. The magneto-optical recording medium as defined in claim 7, wherein the intermediate layer shows a perpendicular magnetization at a temperature not lower than the predetermined temperature (tm).

11. The magneto-optical recording medium as defined in claim 9, wherein a sub-lattice magnetization of the rare-earth metal is more predominant than a sub-lattice magnetization of the transition metal at the room temperature both in the readout layer and in the intermediate layer.

12. A method of reproducing magneto-optical information comprising the steps of:

preparing a magneto-optical recording medium comprising:

a recording layer consisting of a magnetic layer having a perpendicular magnetic anisotropy, whereon an information is recorded; and a readout layer, which is provided on the recording layer, consisting of a magnetic layer having a perpendicular magnetic anisotropy, whereon the information recorded on the recording layer is reproduced by irradiation of light beam, and the readout layer and the recording layer have a relationship wherein the following condition is satisfied:

$$Hc1(ta)+Hw1(ta)\leq -Hc1(t)+Hw1(t),$$

where h1 indicates a thickness of the readout layer, Hc1(ta) a coercive force of the readout layer at a room temperature (ta), Ms1(ta) a saturation magnetization of the readout layer at room temperature, σw (ta) a magnetic domain wall energy between the readout layer and the recording layer at the room temperature, Hc1(t) a coercive force of the readout layer at the temperature (t), Ms1(t) a saturation magnetization of the readout layer at the temperature (t), σw(t) a magnetic domain wall energy between the readout layer and the recording layer at the temperature (t), Hw1(ta) an effective bias magnetic field applied to the readout layer from the recording layer at the room temperature, Hw1(t) an effective bias magnetic field applied to the readout layer from the recording layer at the temperature (t), the effective bias magnetic fields Hw1(ta) and Hw1(t) satisfying Hw1(ta)=σw(ta)/2Ms1(ta)h1 and Hw1(t)=σw(t)/2Ms1(t)h1, and reading out the information, wherein an external magnetic field Hr which satisfies the following conditions is applied:

$$Hc1(t)+Hw1(t)>0$$

and $$Hc1(ta)+Hw1(ta)<Hr<-Hc1(t)+Hw1(t),$$

$$Hr<Hc2(ta)-Hw2(ta),$$

and $Hr<Hc2(t)-Hw2(t)$, where h1 indicates a thickness of the readout layer, Hc1(ta) a coercive force of the readout layer at a room temperature (ta), Ms1(ta) a saturation magnetization of the readout layer at room temperature, σw(ta) a magnetic domain wall energy between the readout layer and the recording layer at the room temperature, Hc1(t) a coercive force of the readout layer at the temperature (t), Ms1(t) a saturation magnetization of the readout layer at the temperature (t), σw(t) a magnetic domain wall energy between the readout layer and the recording layer at the temperature (t), Hw1(ta) an effective bias magnetic field applied to the readout layer from the recording layer at the room temperature, Hw1(t) an effective bias magnetic field applied to the readout layer from the recording layer at the temperature (t), the effective bias magnetic fields Hw1(ta) and Hw1(t) satisfying Hw1(ta)=σw(ta)/2Ms1(ta)H1 and Hw1(t)=σw(t)/2Ms1(t)h1, and where h2 indicates a thickness of the recording layer, Hc2(ta) a coercive force of the recording layer at the room temperature (ta), Ms2(ta) a saturation magnetization of the recording layer at the room temperature, Hc2(t) a coercive force of the recording layer at the temperature (t), Ms2(t) a saturation magnetization of the recording layer at the temperature (t), Hw2(ta) an effective bias magnetic field applied to the recording layer from the readout layer at the room temperature, Hw2(t) an effective bias magnetic field applied to the recording layer from the readout layer at the temperature (t), the effective bias magnetic fields Hw2(ta) and Hw2(t) satisfying Hw2(ta)=σw(ta)/2Ms2(ta)h2 and Hw2(t)=σw(t)/2Ms2(t)h2.

13. The method of reproducing magneto-optical information as defined in claim 12, wherein the magneto-optical recording medium comprising:

a recording layer consisting of a magnetic layer having a perpendicular magnetic anisotropy, whereon an information is recorded;

a readout layer, which is provided on the readout layer, consisting of a magnetic layer having a perpendicular magnetic anisotropy, whereon the information recorded on the recording layer is reproduced by irradiation of light beam; and an intermediate layer provided between the readout layer and the recording layer, which suppresses an effective bias magnetic field applied to the readout layer from the recording layer at the room temperature; and the readout layer and the recording layer have a relationship that an external magnetic field H1 is small than an external magnetic field H4, where the H1 is a minimum external magnetic field necessary to make a magnetization direction of the readout layer direct to the direction reverse to a magnetization direction of the recording layer substantially at room temperature, and the H4 is a maximum external magnetic field necessary to make the magnetization direction of the readout layer direct to the direction same as the magnetization direction of the recording layer at an established temperature (t) not lower than a predetermined temperature (tm) is prepared, and an external magnetic field Hr which satisfies the following conditions is applied:

$Hc1'(t)+Hw1'(t)>0$ and $Hc1'(ta)+Hw1'(ta)<Hr<-Hc1'(t)+Hw1'(t)$, $Hr<Hc2(ta)-Hw2(ta)$, and $Hr<Hc2(t)-Hw2(t)$, where h1' indicates a thickness of a double-layer consisting of the readout layer and the intermediate layer, Hc1'(ta) a coercive force of the double-layer at the room temperature (ta), Ms1'(ta) a saturation magnetization of the double-layer at the room temperature, σw'(ta) a magnetic domain wall energy between the readout layer and the recording layer at the room temperature, Hc1'(t) a coercive force of the dobule-layer at the temperature (t), Ms1'(t) a saturation magnetization of double-layer at the temperature (t), σw'(t) a magnetic domain wall energy between the readout layer and the recording layer at the temperature (t), Hw1'(ta) an effective bias magnetic field applied to the readout layer from the recording layer at the room temperature, Hw1'(t) an effective bias magnetic field applied to the readout layer from the recording layer at the temperature (t), the effective bias magnetic fields Hw1'(ta) and Hw1'(t) satisfying Hw1'(ta)=σw'(ta)/2Ms1'(ta) h1'and Hw1'(t)=σw'(t)/2Ms1'(t)h1', and where h2 indicates a thickness of the recording layer, Hc2(ta) a coercive force of the recording layer at the room temperature (ta), Ms2(ta) a saturation magnetization of the recording layer at the room temperature, Hc2(t) a coercive force of the recording layer at the temperature (t), Ms2(t) a saturation magnetization of the recording layer at the temperature (t), Hw2(ta) an effective bias magnetic field applied to the recording layer from the readout layer at the room temperature, Hw2(t) an effective bias magnetic field applied to the recording layer from the readout layer at the temperature (t), the effective bias magnetic fields Hw2(ta) and Hw2(t) satisfying Hw2(ta)=σw'(ta)/2Ms2(ta)h2 and Hw2(t)=σw'(t)/2 Ms2(t)h2.

* * * * *